United States Patent
Katayama

(10) Patent No.: US 7,187,635 B2
(45) Date of Patent: Mar. 6, 2007

(54) OPTICAL INFORMATION REPRODUCING METHOD AND APPARATUS FOR PERFORMING REPRODUCTION COMPENSATION

(75) Inventor: Tatsushi Katayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 10/123,258

(22) Filed: Apr. 17, 2002

(65) Prior Publication Data

US 2002/0159349 A1   Oct. 31, 2002

(30) Foreign Application Priority Data

Apr. 19, 2001 (JP) ............................ 2001-121462
Oct. 22, 2001 (JP) ............................ 2001-323610

(51) Int. Cl.
G11B 11/10 (2006.01)
B11B 11/18 (2006.01)

(52) U.S. Cl. ................ 369/47.53; 369/59.11; 369/53.27; 369/13.26

(58) Field of Classification Search ............ 369/47.18, 369/53.34, 53.22, 53.35, 47.17, 47.34, 47.52, 369/47.53, 59.11, 59.17, 59.22, 59.23, 59.25, 369/47.49, 44.32, 53.31, 53.37, 116, 59.12, 369/47.5, 47.27, 47.25, 47.35, 13.26, 53.27
See application file for complete search history.

(56) References Cited

U.S. PATENT DOCUMENTS 5,347,505 A * 9/1994 Moritsugu et al. ....... 369/59.12
5,450,383 A * 9/1995 Call et al. ................ 369/47.52
5,574,713 A * 11/1996 Aoki ........................ 369/47.52
5,590,111 A * 12/1996 Kirino et al. ............. 369/47.53
5,617,400 A * 4/1997 Fuji .......................... 369/47.5
5,636,194 A * 6/1997 Furumiya et al. ........ 369/59.11
5,809,004 A * 9/1998 Kobayashi et al. ....... 369/275.3
6,027,825 A   2/2000 Shiratori et al. ............ 428/694
6,134,197 A * 10/2000 Ishibashi et al. ......... 369/44.32
6,421,309 B1 * 7/2002 Kanai et al. .............. 369/59.17
6,611,481 B1 * 8/2003 Koishi et al. ............. 369/47.53

FOREIGN PATENT DOCUMENTS

| JP | 5-197957 A | 8/1993 |
| JP | 6-290496 A | 10/1994 |
| JP | 10-50000 A | 2/1998 |

* cited by examiner

*Primary Examiner*—Andrea Wellington
*Assistant Examiner*—Kim-Kwok Chu
(74) *Attorney, Agent, or Firm*—Fitzpatrick, Cella, Harper & Scinto

(57) ABSTRACT

The present invention provides an optical information reproducing method of detecting a record mark formed in an optical information recording medium and generating a reproduced signal, comprising the steps of: detecting a mark length of each record mark on basis of a reproduced signal, and correcting the reproduced signal by a correction amount corresponding to the detected mark length, and an optical information reproducing apparatus for detecting a record mark formed in an optical information recording medium and generating a reproduced signal, comprising: a detection circuit for detecting a mark length of each record mark on basis of a reproduced signal, and a correction circuit for correcting the reproduced signal by a correction amount corresponding to the detected mark length.

12 Claims, 30 Drawing Sheets

LEADING EDGE IS SHFTEED AHEAD

LEADING EDGE COINCIDES

LEADING EDGE IS SHFTEED BEHIND

RF DIGITAL SIGNAL

CLOCK

TEMPORARY DETERMINATION DATA

MARK LENGTH

JITTER

CHANGE DIRECTION

CORRECTION GATE

CORRECTION AMOUNT

SIGNAL AFTER CORRECTION

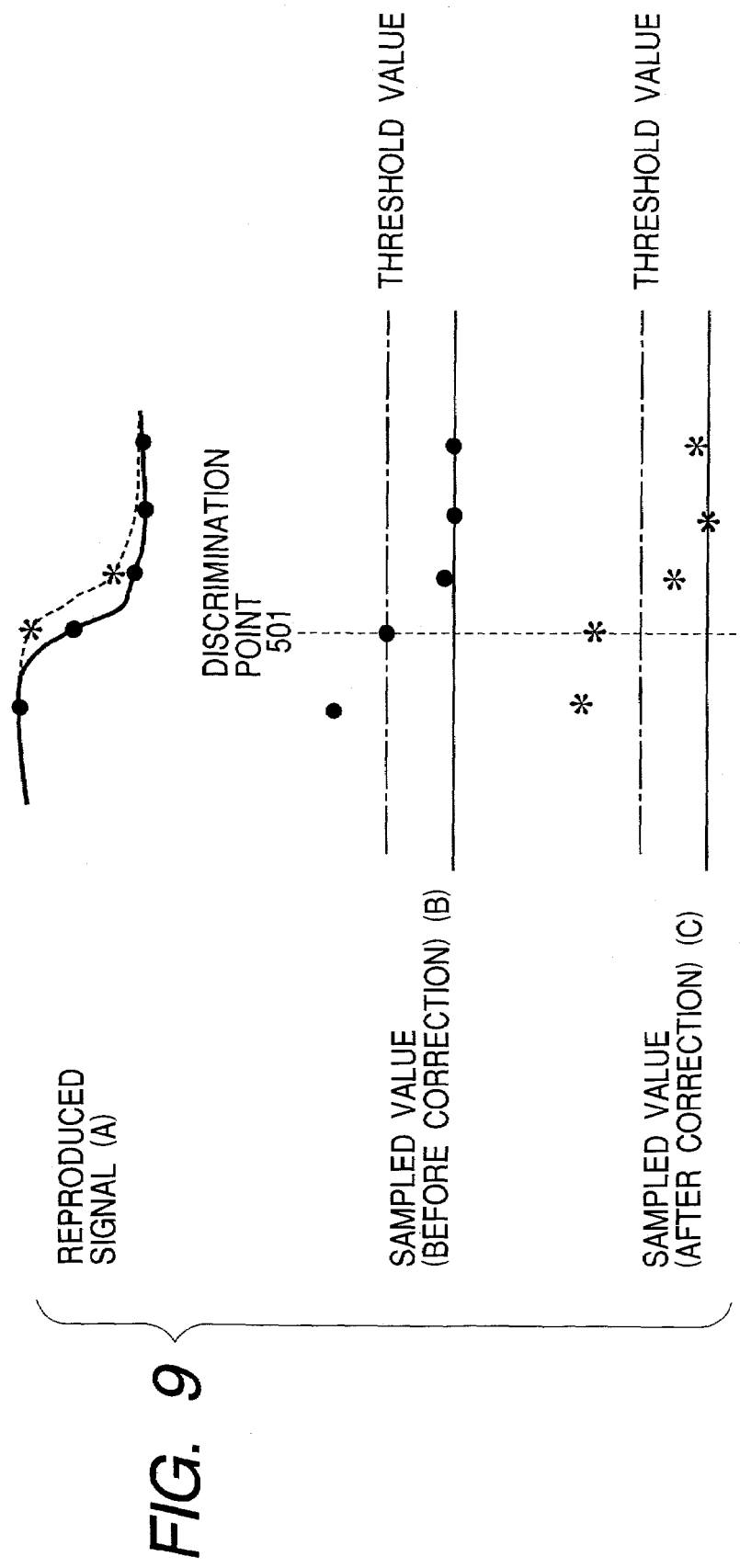

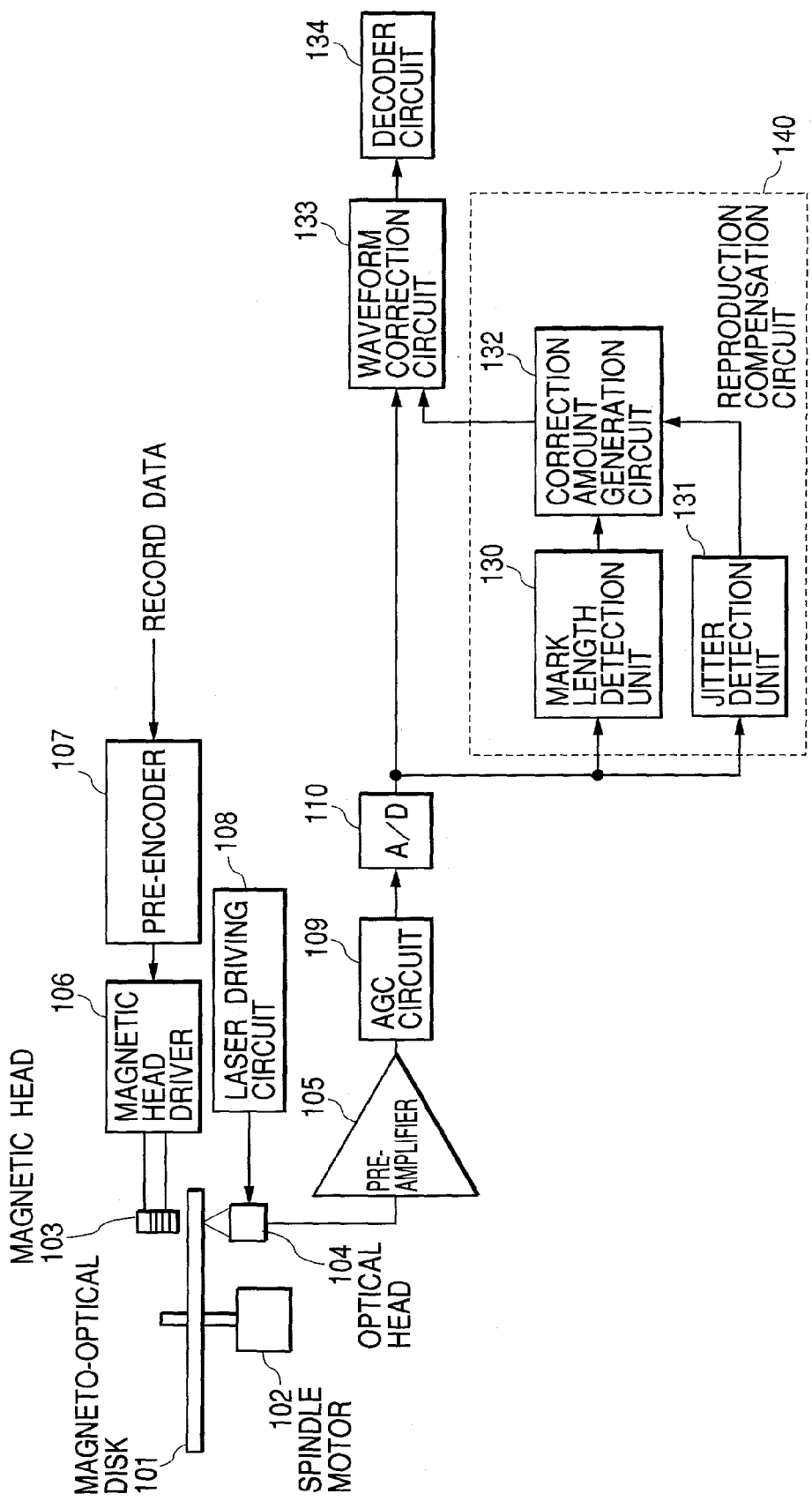

FIG. 29A
REPRODUCED
SIGNAL
FIG. 29B
DIFFERENTIAL SIGNAL
(BEFORE CORRECTION)
FIG. 29C
DIFFERENTIAL SIGNAL
(AFTER CORRECTION)
FIG. 30A
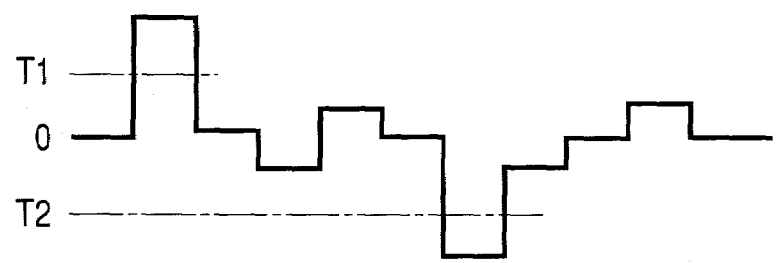
FIG. 30B  1 1 1 1 1 0 0 0 0 0

RF DIGITAL SIGNAL

CLOCK

DIFFERENTIAL SIGNAL

MARK LENGTH

CHANGE DIRECTION

CORRECTION GATE

OFFSET AMOUNT

SIGNAL AFTER CORRECTION

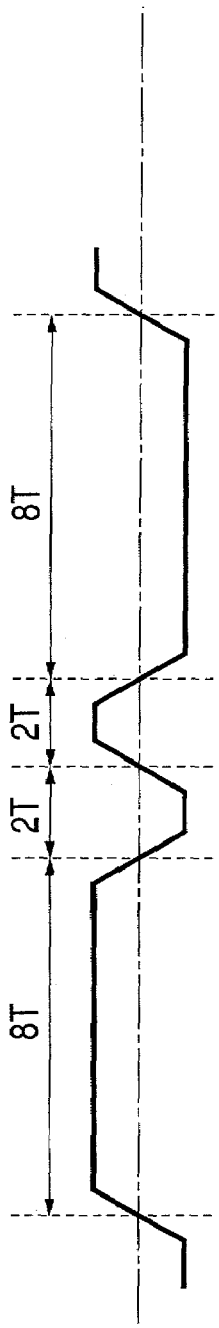
FIG. 35A SIGNAL PATTERN
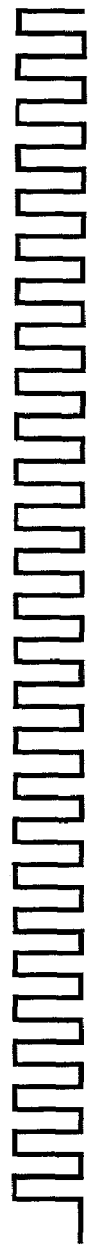
FIG. 35B PLL CLOCK
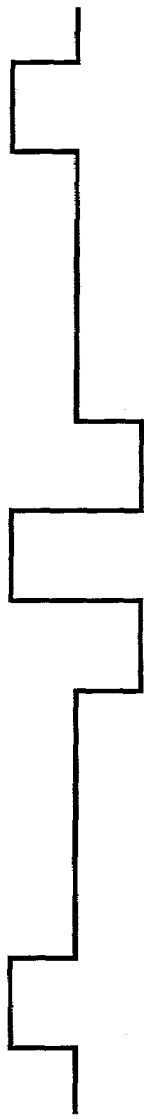
FIG. 35C DIFFERENTIAL SIGNAL
FIG. 35D PHASE ERROR SIGNAL

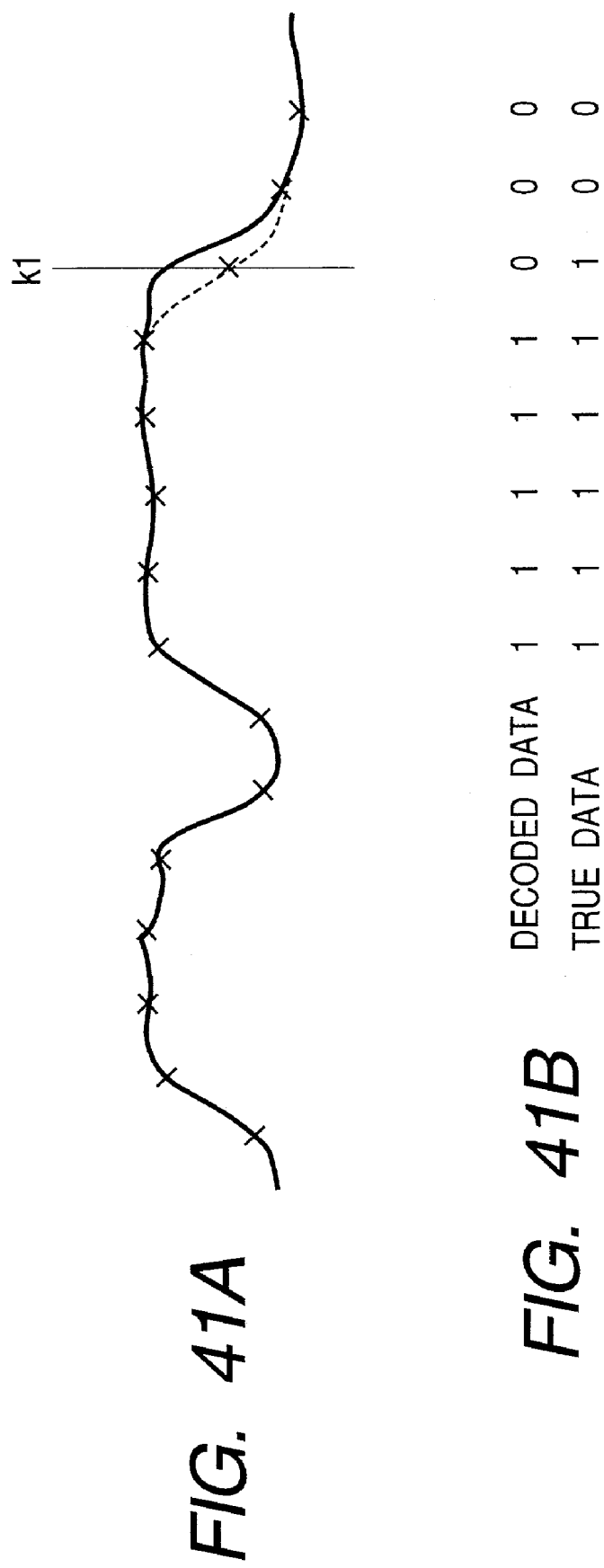

CASE OF PHASE DELAY

CASE OF PHASE COINCIDING

CASE OF PHASE ADVANCE

DETECTION ERROR OF PHASE ERROR DUE TO WAVEFORM DEVIATION

US 7,187,635 B2

OPTICAL INFORMATION REPRODUCING METHOD AND APPARATUS FOR PERFORMING REPRODUCTION COMPENSATION

BACKGROUND OF THE INVENTION

1. Field of the Invention

The present invention relates to an optical information reproducing method and an optical information reproducing apparatus which are used for optical information recording media such as a magneto-optical disk, a compact disk (CD), and a CD-R, and in particular, is suitable for an optical magnetic reproducing method and an optical magnetic reproducing apparatus which reproduce information by utilizing a photo-electro-magnetic effect.

2. Related Background Art

Up to now in a record/reproduction system by optical information recording media, such as a magneto-optical disk, a compact disk, and a CD-R, it is known that a waveform deviation arises in a recorded signal or a reproduced signal according to the characteristics of a medium. The outline of waveform deviation will be described referring to FIGS. 41A and 41B. FIG. 41A shows a reproduced waveform and FIG. 41B shows decoded data. Here, it is assumed that a reproduced waveform is sampled at a leading edge of a clock in a reproduction system. A mark "X" in FIG. 41A denotes a sampling signal. If a waveform deviation arises due to the characteristics of a medium, a leading edge location is changed minutely due to the waveform deviation shown by a broken line when a signal changes from a level "H" to a level "L" at the time k1 in FIG. 41A. When the reproduced waveform where the waveform deviation arises is sampled, it becomes a factor of degrading a PLL loop and a decoder that are subsequent stages.

On the other hand, for example, Japanese Patent Application Laid-Open No. 10-50000 discloses a method of performing a data detection determination after adding a predetermined positive offset value to reproduced data at a turning point where a level shift from the level "H" to the level "L". In addition, Japanese Patent Application Laid-Open No. 05-197957 discloses a method of compensating a waveform deviation at the time of recording by measuring record pulse width, etc. at the time of information record, and controlling a leading edge location.

By the way, in a PLL loop (data PLL) based on the sampled data of a reproduced signal, incorrect detection arises in a phase error signal by the waveform deviation. FIG. 26 shows the outline of the phase error detection in data PLL. In the data PLL, a phase error is obtained on the basis of the sampled data in an edge section of a reproduced signal. In FIGS. 42A to 42D, numeral 920 denotes a reproduced signal, and a black circle "●" and an open circle "○" are sampled data with a clock.

FIG. 42A shows a case where the phase of the clock delays from the phase of the reproduced signal, and a phase error is outputted as a positive value. FIG. 42B shows a case where the phase of the clock is in conformity with the phase of the reproduced signal, and a phase error becomes zero. FIG. 42C shows a case where the phase of the clock leads the phase of the reproduced signal, and a phase error is outputted as a negative value. The PLL loop performs controls on the basis of this phase error signal. However, if waveform deviation 930 to the reproduced signal 920 arises as shown in FIG. 42D, a phase error detected in an edge section becomes a value shown by a black square "■" and an error value is generated.

However, the above-described method of Japanese Patent Application Laid-Open No. 10-50000 in which only a level changing point is referred cannot treat, for example, a case where an amount of a waveform deviation changes depending on a waveform pattern to the changing point. Here, if a section of the level "H" is referred to as a mark, and a section of the level "L" is referred to as a space. If fluctuating the amount of a waveform deviation depending on an interval of the mark and space, etc., it is not possible to obtain a desired effect unless a correction amount of a waveform deviation is set adaptively according to the interval (record mark length) of the mark or space.

Furthermore, the method of compensating a waveform deviation at the time of record that is disclosed in Japanese Patent Application Laid-Open No. 05-197957 has a large possibility of generating bit droppage, etc. by the influence of compensation by a record pulse below the shortest mark length if the shortest mark length is shortened for a high densification. In addition, since the edge section of a reproduced signal is used in the data PLL, appropriate correction of the record mark length becomes necessary for achieving desired performance. Therefore, correction by a fixed amount of correction at a changing point of a level that is disclosed in the above-described Japanese Patent Application Laid-Open No. 10-50000 could not treat the waveform deviation of a reproduced signal.

SUMMARY OF THE INVENTION

The present invention has been made in view of the above-described conventional problems, and an object of the present invention is to provide an optical information reproducing method and an optical information reproducing apparatus for correcting a waveform deviation generated by the characteristics of a medium, a record and reproduction system, etc., and for being able to correctly reproduce recording information.

An example of achieving the object of the present invention is an optical information reproducing method of detecting record marks formed in an optical information recording medium and generating a reproduced signal, comprising the steps of;

detecting a mark length of each record mark based on a reproduced signal; and correcting the reproduced signal by a correction amount corresponding to the detected mark length.

BRIEF DESCRIPTION OF THE DRAWINGS

FIG. 9 is a diagram for explaining a waveform correction method;

FIG. 10 is a block diagram showing a second embodiment of the present invention;

FIGS. 29A, 29B and 29C are diagrams for explaining the correction processing of a waveform correction circuit in FIG. 25;

FIGS. 30A and 30B are diagrams for explaining a decoding method in FIG. 25;

FIGS. 35A, 35B, 35C and 35D are diagrams for explaining the operation of the correction coefficient generation circuit of FIG. 32;

FIGS. 41A and 41B are diagrams for explaining a waveform deviation of a conventional reproduced signal.

DESCRIPTION OF THE PREFERRED EMBODIMENTS

Figure 1:
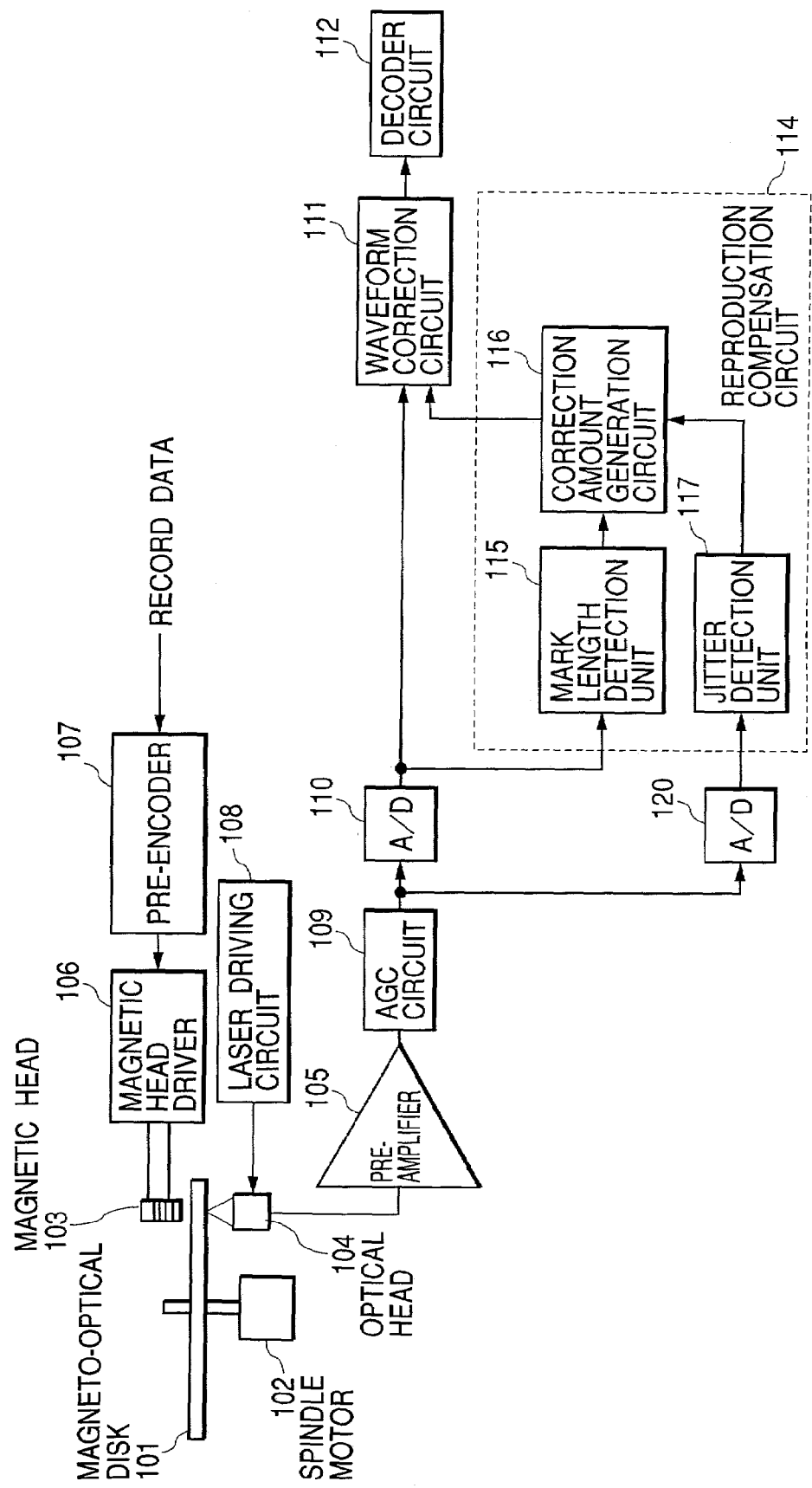
FIG. 1 is a block diagram showing a first embodiment of the present invention.

Hereafter, embodiments of the present invention will be described referring to the drawings. In addition, the present invention is used for an information reproducing method and an information reproducing apparatus for optical information recording media such as a magneto-optical disk, a compact disc, and a CD-R, and is not limited in particular to an information reproducing method and an information reproducing apparatus for magneto-optical recording media such as a magneto-optical disk. Nevertheless, hereafter, an information reproducing method and an information reproducing apparatus for a magneto-optical recording medium for which the present invention is used suitably, and in particular, a magneto-optical disk will be described. In addition, in all the following embodiments, a mark portion and a space portion of a signal are generically referred to as "record mark".

(Embodiment 1)

FIG. 1 is a block diagram showing the configuration of a first embodiment of a magneto-optical reproducing apparatus according to the present invention. In FIG. 1, numeral 101 denotes a magneto-optical disk as an information-recording medium, and numeral 102 denotes a spindle motor for rotating the magneto-optical disk 101 at a predetermined speed. A magnetic head 103 for generating a magnetic field modulated according to a record signal is arranged above the top face of the magneto-optical disk 101, and an optical head 104 is arranged below the bottom face of the disk with opposing the magnetic head 103.

The optical head 104 radiates a light beam for recording, and records information, or radiates the light beam for reproduction, detects the reflected light from the medium, and reproduces recorded information. At this time, a semiconductor laser (not shown in the drawings) that is a light source for recording and reproduction, and a photosensor (not shown in the drawings) that detects light reflected from a medium is provided in the optical head 104. A semiconductor laser is driven by a laser drive circuit 108, and recording and reproduction of information are performed by controlling a light beam of the semiconductor laser for recording or reproduction. Moreover, as the magneto-optical disk 101, a magnetic domain wall motion-type magnet-optical medium is used, and information reproduction by magnetic domain wall motion is performed.

A reproducing method using this magnetic domain wall motion-type magneto-optical medium is disclosed in, for example, Japanese Patent Application Laid-Open No. 6-290496. An example of the reproducing method using the magnetic domain wall motion-type magneto-optical medium disclosed in this Japanese Patent Application Laid-Open No. 6-290496 will be described with reference to FIGS. 23A to 23C.

Figure 23A:
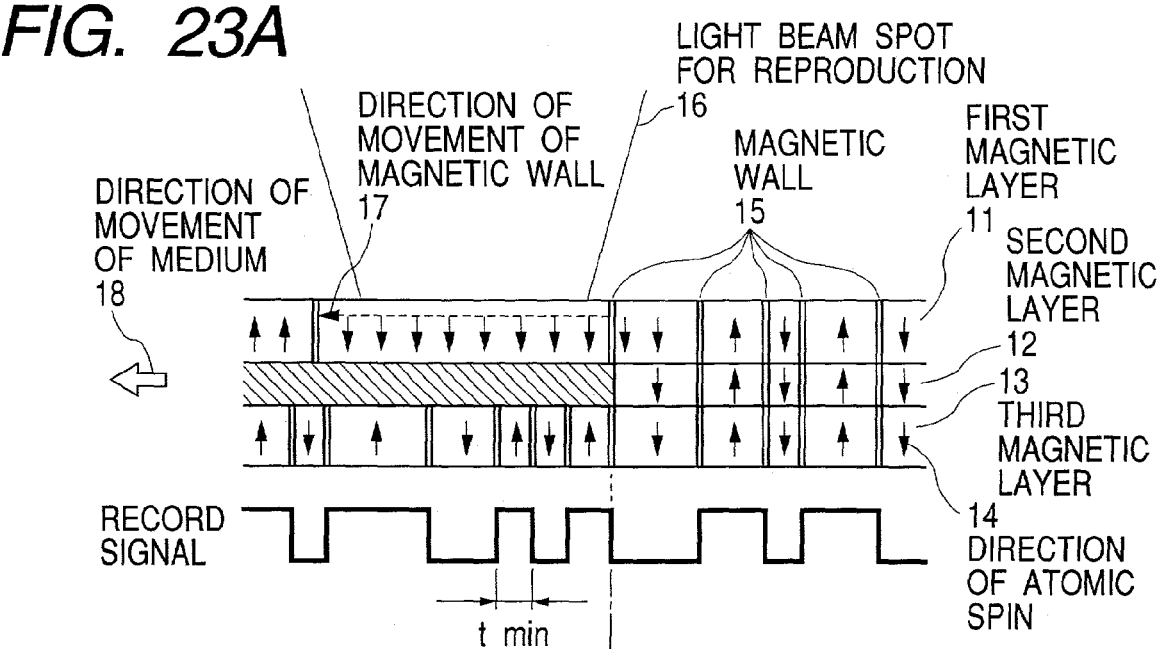
FIGS. 23A, 23B and 23C are diagrams showing an example of a reproducing method using a magnetic domain wall motion type magneto-optical medium.
Figure 23B:
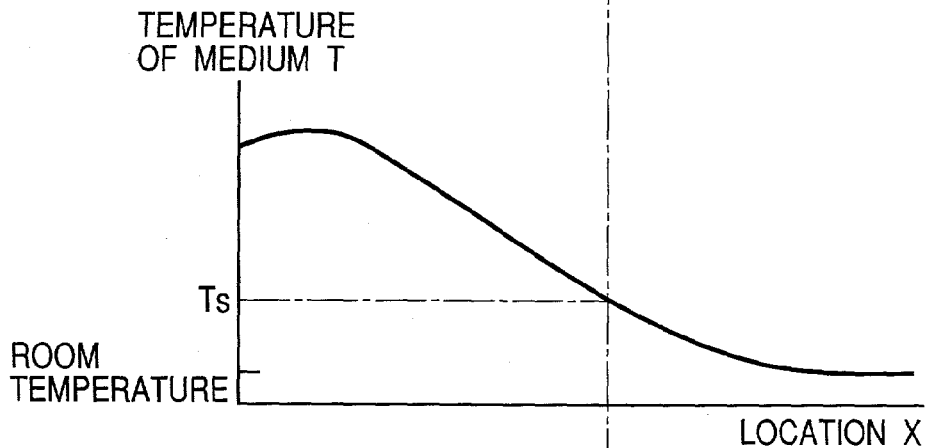
Figure 23C:
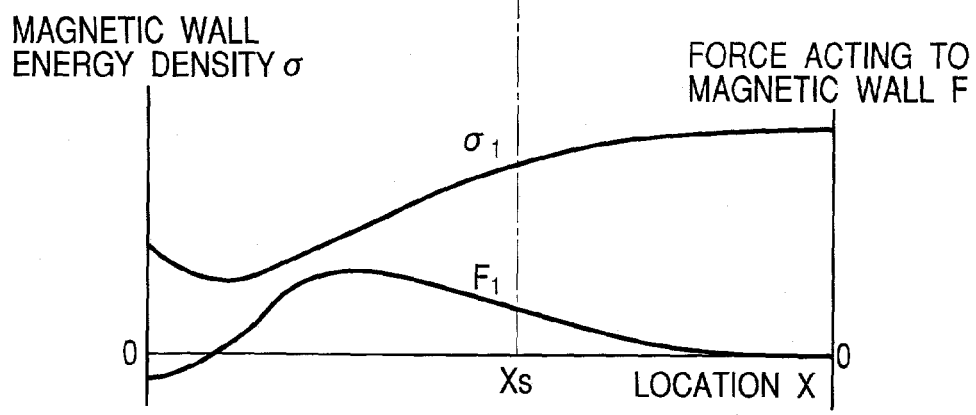

FIGS. 23A to 23C are schematic diagrams for explaining the magnetic domain wall motion-type magneto-optical recording medium and an action in a reproducing method thereof.

FIG. 23A is a schematic sectional view of a structural example of the magnetic domain wall motion-type magneto-optical recording medium. The magnetic layers of this medium are formed by sequentially stacking a first magnetic layer 11, a second magnetic layer 12, and a third magnetic layer 13. An arrow 14 in each layer denotes the direction of atomic spin. A magnetic domain wall 15 is formed in a boundary section of areas where directions of spins are mutually reverse. Moreover, a record signal in this recording layer is also denoted as a graph at the bottom side of FIG. 23A. A first magnetic layer 11 comprises a perpendicular magnetic film having a relatively small magnetic domain wall coercive force and a large magnetic domain wall mobility at a temperature near the ambient temperature in comparison with a third magnetic layer 13, a second magnetic layer 12 comprises a magnetic layer having a Curie temperature lower than the first magnetic layer 11 and the third magnetic layer 13, and the third magnetic layer 13 is a perpendicular magnetic film.

FIG. 23B is a graph showing temperature distribution formed in the above-described magneto-optical recording medium. Although this temperature distribution may be induced on a medium by a light beam itself radiated for reproduction, it is desirable to raise temperature ahead a spot of the light beam for reproduction by using another heating means together, and to form the temperature distribution having the peak of temperature behind the spot. Here, at a location $x_s$, medium's temperature becomes temperature $T_s$ near the Curie temperature of the second magnetic layer 12.

FIG. 23C is a graph showing the distribution of the magnetic domain wall energy density $\sigma_1$ of the first magnetic layer 11 corresponding to the temperature distribution in FIG. 23B. If there is the inclination of magnetic domain wall energy density $\sigma_1$ in the direction x in this manner, the force $F_1$ obtained from the following formula acts on a magnetic domain wall of each layer existing in the location x.

$$F_1 = \partial \sigma_1 / \partial x$$

This force $F_1$ acts to move the magnetic domain wall to the side of a lower magnetic domain wall energy. Since the first magnetic layer 11a has a small magnetic domain wall coercive force and a large magnetic domain wall mobility, a magnetic domain wall is independently moved by this force $F_1$ with ease. However, since medium's temperature is lower than $T_s$ in an area (a right-hand side in the figure) ahead of the location $x_s$ and is in exchange coupling with the third magnetic layer 13 having a large magnetic domain wall coercive force, the magnetic domain wall in the first magnetic layer 11 is also fixed to the location corresponding to the location of the magnetic domain wall in the third magnetic layer 13.

If the magnetic domain wall 15 is at the location $x_s$ of a medium as shown in FIG. 23A, medium's temperature rises to the temperature $T_s$ near the Curie temperature of the second magnetic layer, and the exchange coupling between the first magnetic layer and the third magnetic layer is cut. Consequently, as a broken line arrow 17 shows, the magnetic domain wall 15 in the first magnetic layer momentarily moves to an area where temperature is higher and magnetic domain wall energy density is smaller.

When the magnetic domain wall 15 passes through the bottom of the spot 16 of the light beam for reproduction, all the atomic spin of the first magnetic layer in the spot is aligned in one direction. Then, whenever the magnetic domain wall 15 comes to the location $x_s$ with the movement of the medium, the magnetic domain wall 15 momentarily moves below the spot, the direction of the atomic spin in the spot is reversed, and all the spins are aligned in one direction. Consequently, as shown in FIG. 23A, the amplitude of a reproduced signal does not depend on an interval (namely, record mark length) of the magnetic domain wall currently recorded, but always becomes a constant and greatest amplitude, and hence, it is completely released from problems such as waveform interference resulting from the optical diffraction limitation.

In the case of informational recording, the magneto-optical disk 101 that is the above-described magnetic domain wall movement-type magneto-optical medium is rotated at a predetermined rate by the spindle motor 102, and record data is supplied to the pre-encoder 107 in this state. The pre-encoder 107, for example, performs the demodulation of NRZI series of data. A modulated signal outputted from the pre-encoder 107 is supplied to a magnetic head driver 106, and the magnetic head driver 106 drives the magnetic head 103 for external magnetic field generation according to the modulated signal. Thereby, the magnetic head 103 generates a magnetic field according to the modulated signal, and applies it to the magneto-optical disk 101. Simultaneously, data is recorded on the magneto-optical disk 101 by radiating a magneto-optical disk 101 with the light beam for recording generated from optical head 104 by the driving signal from the laser drive circuit 108.

On the other hand, in the case of informational reproduction, similarly, the magneto-optical disk 101 is controlled to rotate at the predetermined rate, and the light beam for reproduction is radiated on the magneto-optical disk 101 from the optical head 104. The reflected light from the magneto-optical disk 101 is detected by a photosensor of the optical head 104, and an RF signal is generated. This RF signal is supplied to an AGC circuit 109 through a preamplifier 105, a gain control is performed according to the RF signal in AGC circuit 109, and the RF signal with a predetermined amplitude is generated.

The reproduced RF signal processed by the AGC circuit 109 is converted into a digital signal by an A/D converter 110 and A/D converter 120. The RF digital signal converted into the digital signal is supplied to a waveform correction circuit 111 and a reproduction compensating circuit 114. The reproduction compensating circuit 114 comprises a mark length detection unit 115, a jitter detection unit 117 and a correction amount generation circuit 116 and detects the record mark length of data from the RF digital signal, and detects a jitter from the reproduced signal near the rear edge at each mark length, and generates the waveform deviation correction signal corresponding to each record mark length. The waveform correction circuit 111 corrects the RF digital signal based on the waveform deviation correction signal supplied from the reproduction compensating circuit 114.

The corrected RF digital signal is outputted to a decoder circuit 112, and the decoder circuit 112 outputs decoded data by differential detection. In addition, here, although the decoded data is generated by the differential detection, well-known decoding methods such as PRML and a bit-by-bit method can be used.

Figure 2:
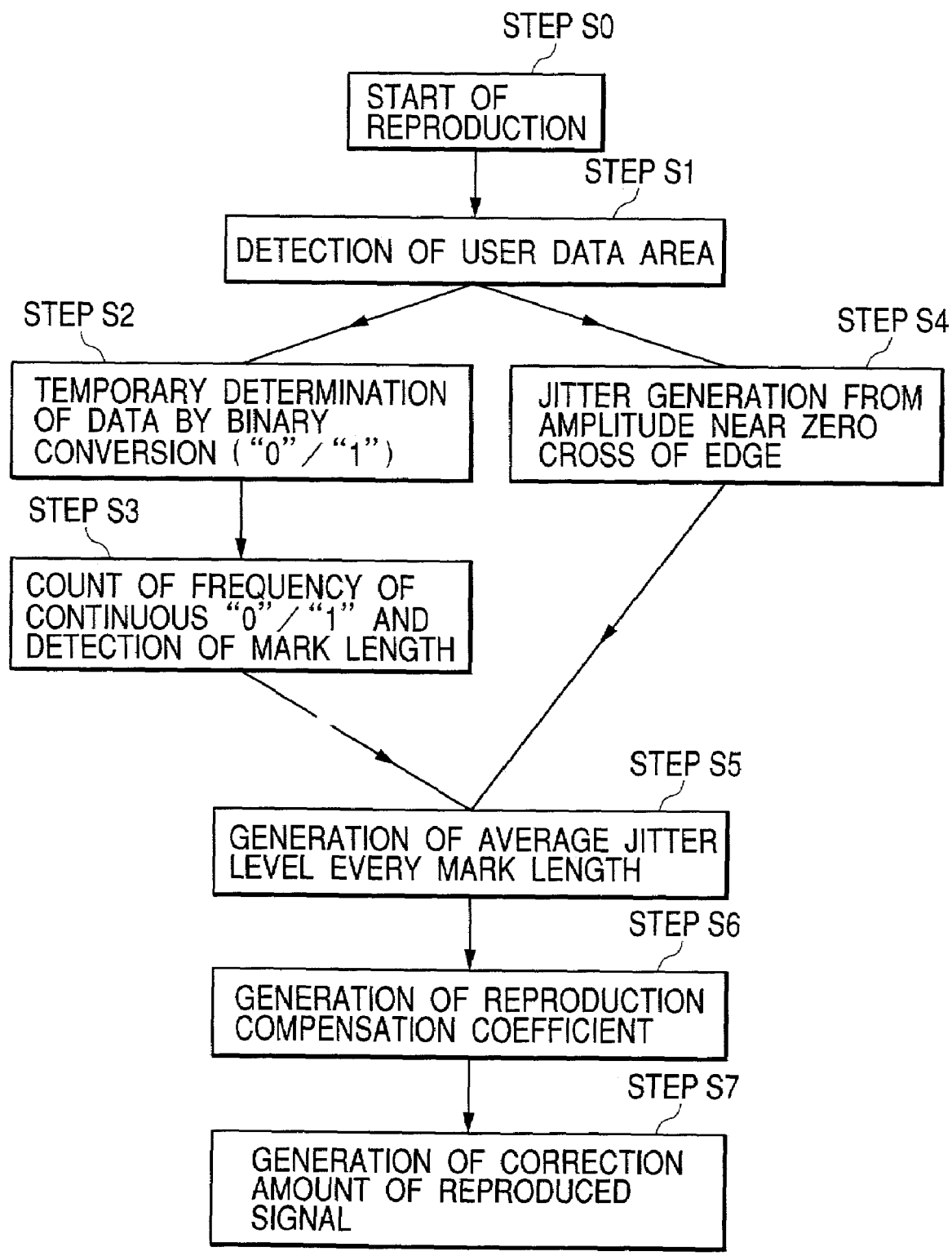
FIG. 2 is a block diagram showing the sequence of correction coefficient generation in FIG. 1.

Next, the generation of a correction coefficient for reproduction compensation that is the feature of this embodiment will be described. FIG. 2 shows the sequence of the generation of a correction coefficient. The feature of the present invention resides in that the correction coefficient for reproduction compensation is generated from user data that a user reproduces and uses, and hence, it is not necessary to record information especially for reproduction compensation.

At step S0 in FIG. 2, reproduction is started by the above-mentioned recording and reproducing apparatus.

Figure 19:
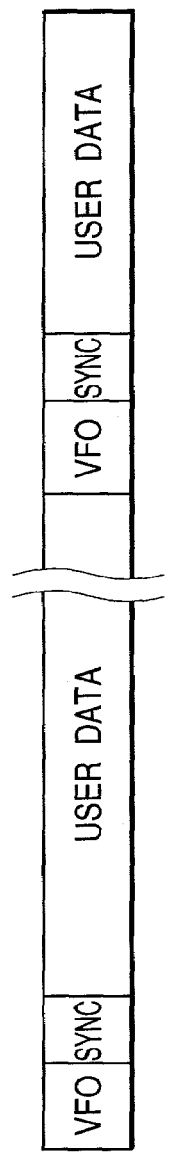
FIG. 19 is a diagram for explaining user data in the present invention.
Figure 20:
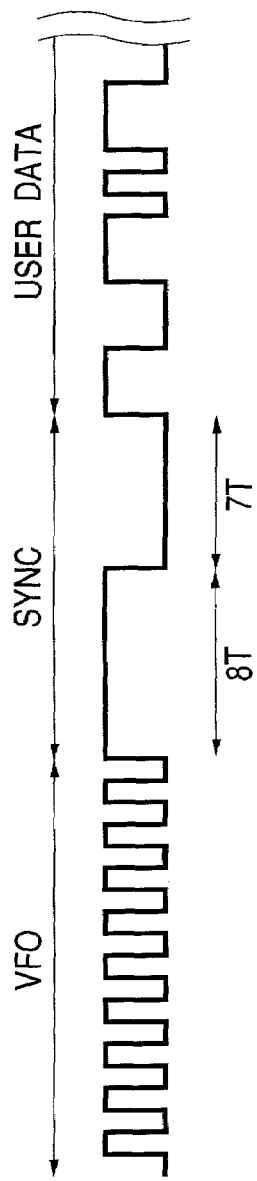
FIG. 20 is a diagram for explaining user data in the present invention.

At step S1 in FIG. 2, a user data area is detected based on the reproduced signal, and the following processing is performed. FIG. 19 is a schematic diagram of a form of a reproduced signal. The reproduced signal comprises a VFO where a signal at a single frequency is recorded, a SYNC which shows the start of a user data area, and user data. FIG. 20 shows the detail of each unit. The VFO is recorded in a tone signal such as a 4T pattern, and the SYNC is constituted with a unique pattern not appearing in a recorded code series such as 8T-7T. The mark length detection unit 115 detects a SYNC pattern, and performs formation processing of the following correction coefficients.

First, as shown in FIGS. 42A to 42D, a clock signal whose phase can sample a zero cross point of a leading edge of the reproduced waveform is generated by the PLL circuit not shown in the drawings. The generated clock is delayed by ½ clock phase, and is supplied to the A/D converter 110. FIG. 41A shows the outline of a signal converted into the digital signal by the A/D converter 110. The mark "X" in FIG. 41A, as described above, denotes a sampling signal. The mark length detection unit 115 performs the temporary determination of data by performing the binary conversion in comparison with a threshold at step S2 in FIG. 2 from the above-described reproduced signal. It is assumed that data is constituted by two codes, "0" and "1".

Figure 3:
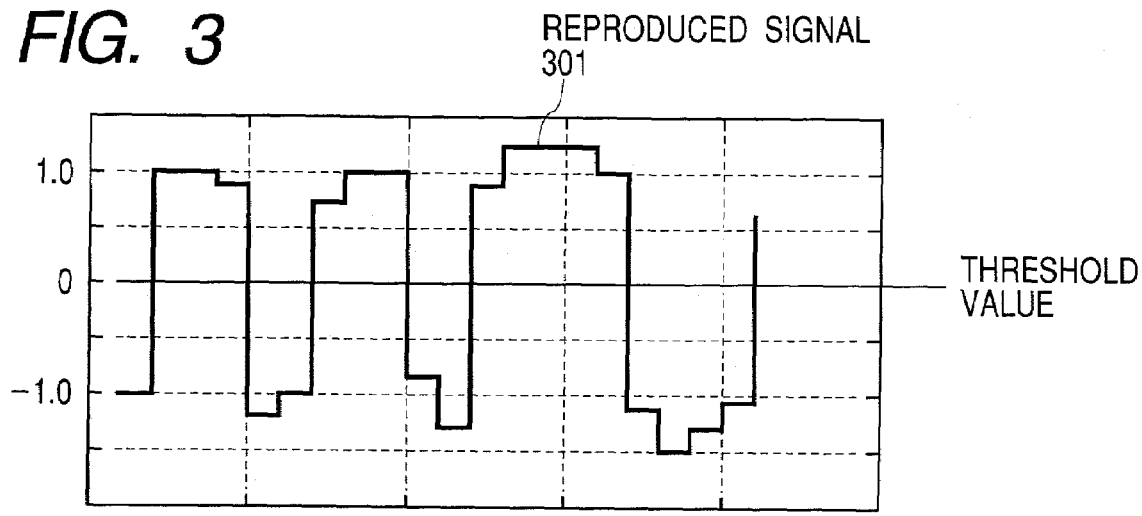
FIG. 3 is a chart for explaining the binary conversion of a reproduced signal.

FIG. 3 shows the outline of binary conversion. The binary conversion compares reproduced signal S(k) with a predetermined threshold (0), and performs the temporary determination of data by the followings.

$$S(k)<0 \rightarrow \text{"0"}$$

$$S(k)\geq 0 \rightarrow \text{"1"} \quad (1)$$

Here, although peak detection is used for detecting mark length, it is also possible to use well-known detection methods such as the below-mentioned PR detection and PRML.

Next, at step S3 in FIG. 2, a mark length is obtained by counting the continuous number of "0" or "1" based on the temporary determination result.

In addition, the clock (which is not delayed by ½ clock phase) generated by the above-mentioned PLL circuit is supplied to the above-mentioned A/D converter 120. Signal S' sampled with this clock is supplied to a jitter detection unit 117.

Figure 4A:
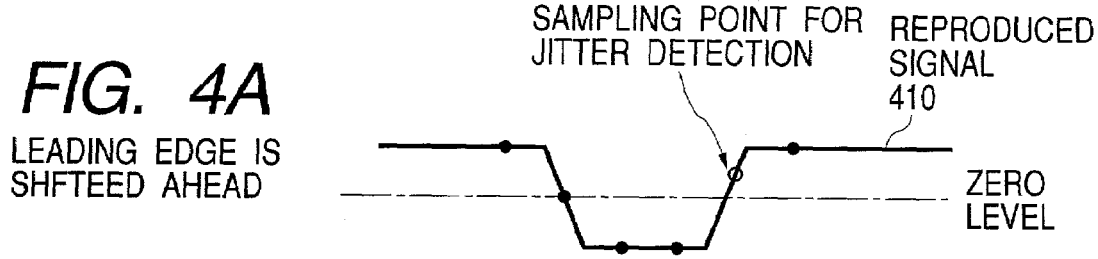
FIGS. 4A, 4B and 4C are charts for explaining a jitter detection method.
Figure 4B:
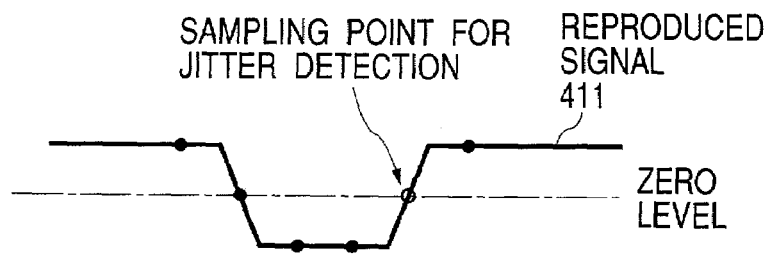
Figure 4C:
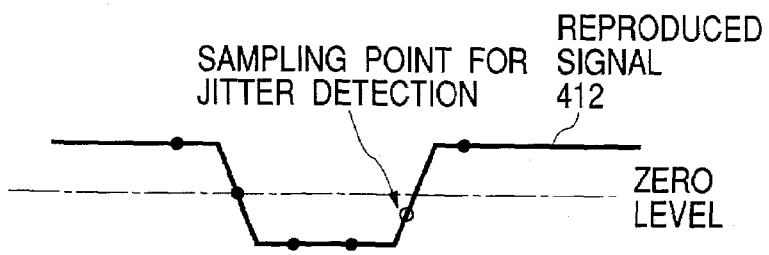

The jitter of a reproduced signal is detected at step S4 in FIG. 2. The outline of the jitter detection is shown in FIGS. 4A to 4C. FIGS. 4A to 4C show a reproduced signal 410 near a certain time, and a sampling signal S' (● and ○). The jitter detection unit 117 measures a jitter by the sampled data (○) near the zero cross of S'. FIG. 4A shows the case where a leading edge shifts ahead, and the sampled data (○) near the zero cross is shifted to the plus side. FIG. 4B shows the case where the phase of a leading edge coincides, FIG. 4C is the case where the leading edge shifts behind, and hence, the sampled data (○) neat the zero cross is shifted to the minus side.

A jitter (J) is proportional to sampled data S' (○) near the zero cross, and can be generated by performing the multiplication of the predetermined amplitude-time conversion factor m as follows:

$$J=m\cdot S' \quad (2)$$

Figure 5:
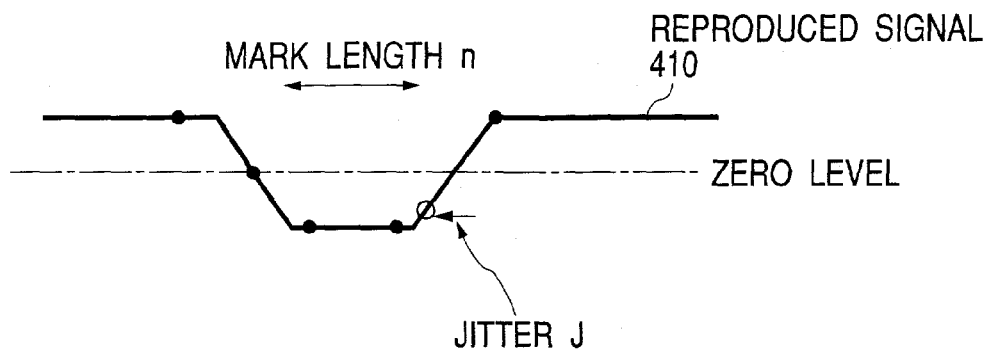
FIG. 5 is a chart for explaining the relation between the jitter and the mark length.

As shown in FIG. 5, by the mark length detection unit 115 and the jitter detection unit 117, the mark length n of a reproduced signal and the jitter J in the rear edge of this mark length can be obtained.

In the correction amount generation circuit 116, the correction amount of a reproduced signal is generated from the above-described mark length and jitter. An outline of the correction amount generation circuit 116 is shown in FIG. 6.

Here, it is assumed that an RLL (1, 7) code is used as a recording code, and hence, the mark length of data after NRZI is restricted to 2 to 8.

Figure 6:
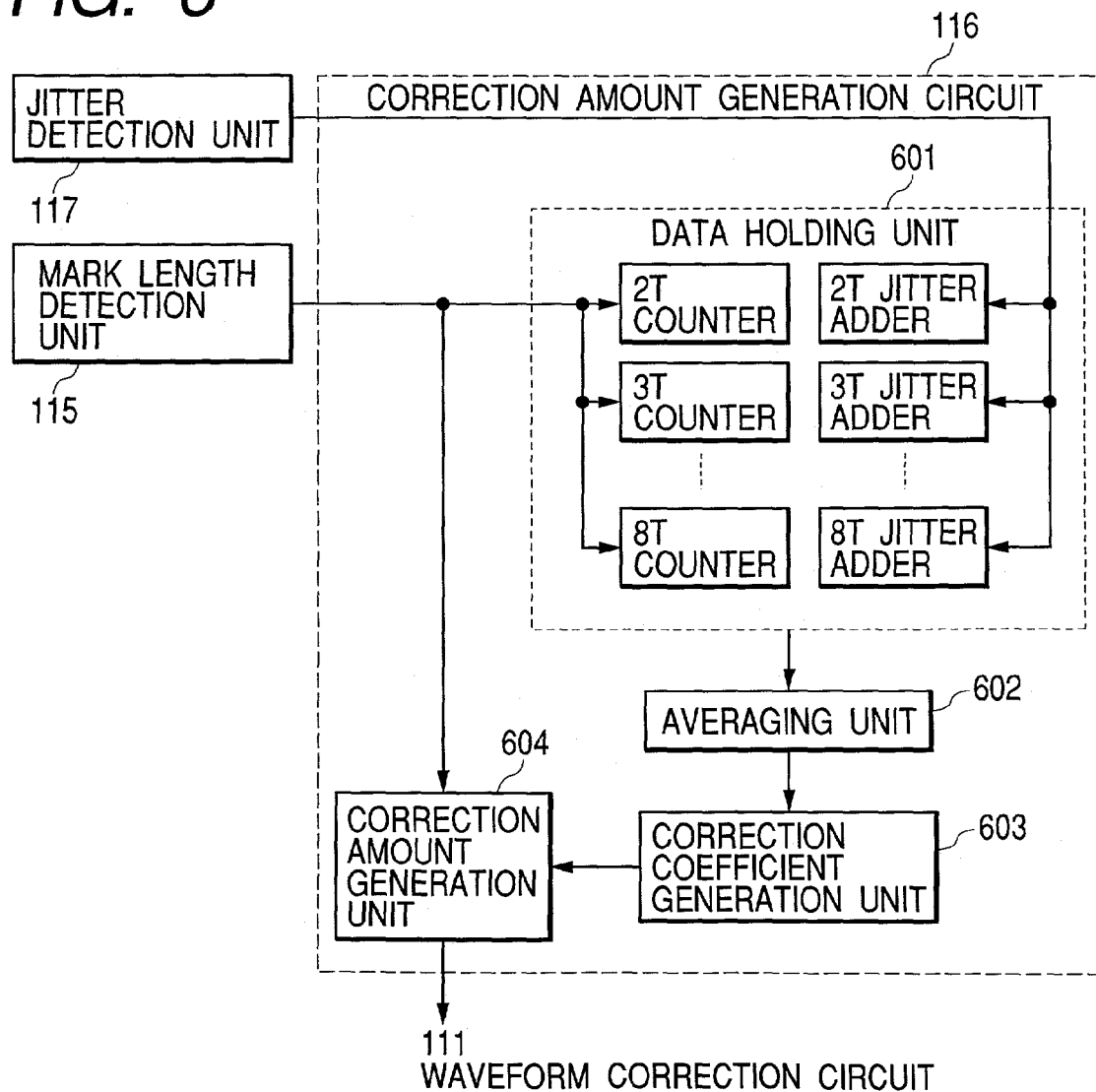
FIG. 6 is a block diagram for explaining the reproduction correction circuit in FIG. 1.

As shown in FIG. 6, the correction amount generation circuit 116 has a counter counting the frequency of appearance in each mark length, and an adder adding a jitter in the rear edge section of each mark length, inside a data holding unit 601.

Figure 8A:
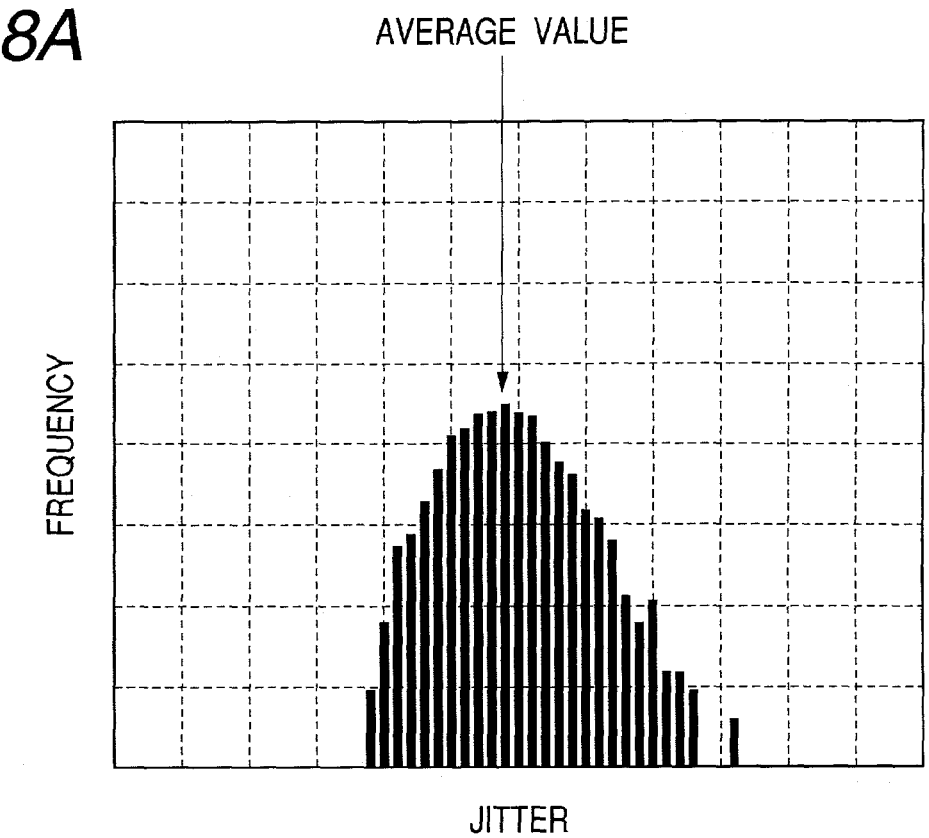
FIGS. 8A and 8B are diagrams for explaining a method of generation a correction coefficient.

At step S5 in FIG. 2, the averages of jitters in each of the above-described mark lengths are generated. In an averaging unit 602 in FIG. 6, a frequency of appearance in each mark length and an addition value of the jitter in each mark length are read from the data holding unit 601 by a control signal from a CPU not shown in the drawings, and an average of the jitter in each mark length in its rear edge is computed. FIG. 8A shows the outline of the distribution of jitters in certain mark length.

Figure 8B:
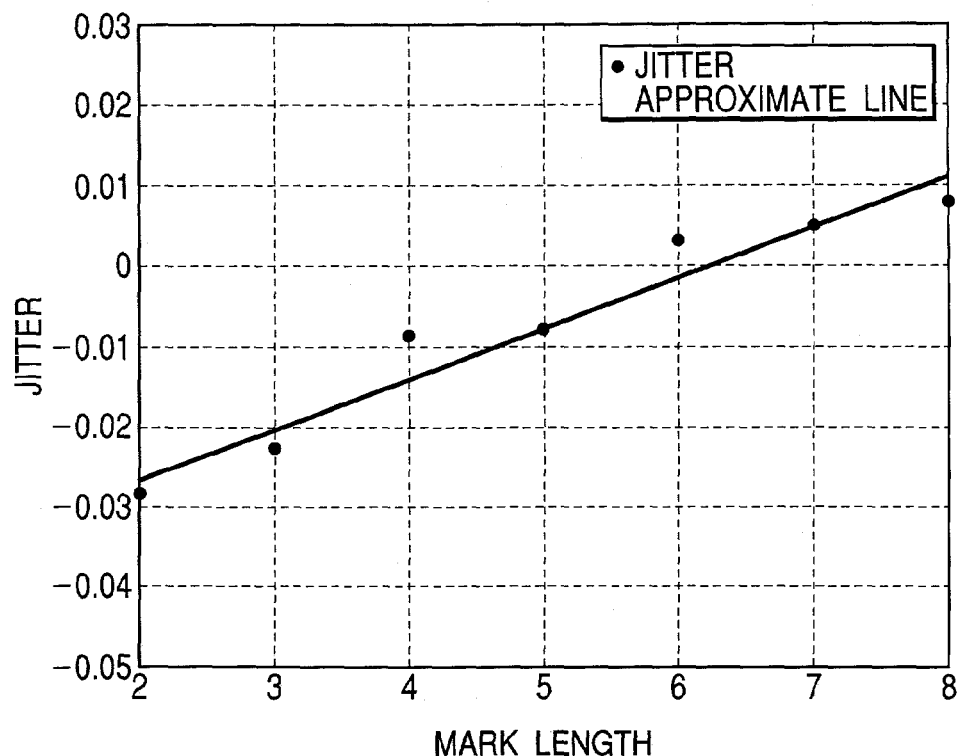

The correction coefficient generation unit 603, as shown at step S6 in FIG. 2, calculates a reproduction compensation coefficient based on the average of jitters in each mark length. FIG. 8B is a graph obtained by plotting the mark length in a horizontal axis and the jitter average in a vertical axis. The correction coefficient generation unit 603 obtains an approximation line with, for example, a method of least squares, on the basis of the data shown in FIG. 8B. The approximation line shown in FIG. 8B is as follows:

$$J=A\cdot n+B \quad (3)$$

Here, J denotes a jitter, n denotes a mark length, and A and B denote reproduction correction coefficients.

Figure 21:
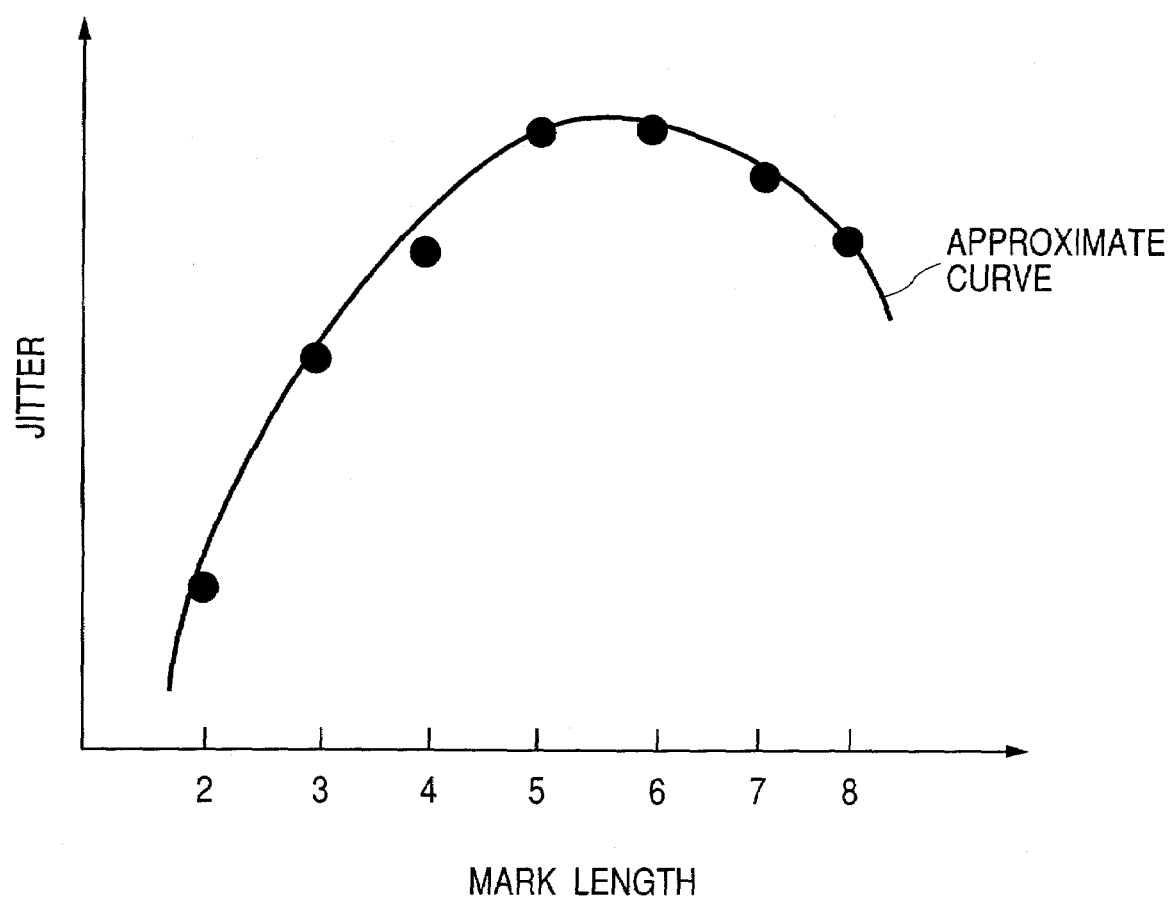
FIG. 21 is a diagram for explaining a method of generating a correction coefficient.

In addition, although the method for obtaining a jitter J by the linear approximation shown in Formula (3) here is shown, it is possible to arbitrarily set a degree, etc. and to increase correction coefficients according to the degree. In addition, it is good to perform approximation with well-known methods such as polynomial approximation as shown in FIG. 21. Furthermore, it is also effective to generate the correction amount by holding jitters in each mark length shown in FIG. 8B in memory, etc. and reading them.

In the correction amount generation unit 604 in FIG. 6, as shown at step S7 in FIG. 2, the correction amount for a reproduced signal is generated. The jitter J is generated by using the mark length n, which is detected in the mark length determination unit 115 based on the reproduced signal, and the above-described correction coefficients A and B, and a correction amount Y is computed as follows:

$$Y=-J\cdot r \quad (4)$$

Here, r denotes a jitter amplitude conversion coefficient that is determined by characteristics of a medium, a record and reproduction system, etc.

As for the generation of the correction coefficient, in an initial state, the information on the record mark lengths and jitters for the generation of the correction coefficient is accumulated by performing reproduction for predetermined time or reproduction of the predetermined volume of data, and the correction coefficient is computed by the above-described processing. For example, the correction coefficient is generated based on a reproduced signal corresponding to several tens of sectors after reproduction start, that is, about 75,000 to 150,000 bits in a number of bits. Next, in a steady state, the correction coefficient is generated with serially updating the above-described record mark lengths and jitters.

As the timing of update of the correction coefficient, it is also possible to update it every predetermined time interval besides serially updating, and it is also possible to accumulate record mark lengths and jitters every predetermined time interval or every data amount, and to update the correction coefficient based on these data.

Here, in magneto-optical recording, the temperature of a laser beam irradiation section of a magneto-optical recording medium reaches to a Curie point by irradiation of a laser beam at the time of recording, and magnetization disappears. However, at the peripheral section where temperature is not rising to a Curie point, magnetization exists and a stray magnetic field caused by the magnetization exists. Although a magnetic domain wall which is a record mark edge is formed in a rear edge in the light beam traveling direction, those stray magnetic fields act in the state that they are superimposed on the modulation magnetic field applied by the magnetic head from the outside for magnetic domain wall formation, at the time of the magnetic domain wall formation which is a record mark edge. The size of this stray magnetic field changes with the interval between a magnetic domain wall formed immediately before and a magnetic domain wall which is going to be formed next, i.e., the record mark length to be formed, and the mark length located in front of it. Therefore, the intensity of a stray magnetic field that acts on a magnetic domain wall forming section changes with mark length (alternatively mark length row) to be recorded.

Hereafter, the above-described stray magnetic field will be explained. FIG. 24C is a diagram showing magnetization and a stray magnetic field caused by it. Although a magnetic domain wall which is a record mark edge is formed in a rear edge in the light beam traveling direction as shown in FIG. 24C, stray magnetic fields are superimposed on a modulation magnetic field applied by the magnetic head from the outside for magnetic domain wall formation.

The size of this stray magnetic field changes with the interval between a magnetic domain wall formed immediately before and a magnetic domain wall which is going to be formed next, i.e., the record mark length to be formed, and the mark length located in front of it. In addition, the formed location of a magnetic domain wall is determined in the relation between temperature and magnetic field strength. Here, since laser beam intensity and the application magnetic field strength from the magnetic head are kept in a steady state and the stray magnetic field intensity that is superimposed differs if record mark length or a record mark length row differs, the magnetic field strength applied to a location of magnetic domain formation is an intensity obtained by superimposing stray magnetic field intensity on the magnetic field strength from the magnetic head. Hence, as described above, the magnetic field strength substantially applied to a magnetic domain forming part changes with the record mark length or record mark length row to be formed. In consequence, a phenomenon that a location of magnetic domain wall formation changes with record mark length appears.

Figure 24A:
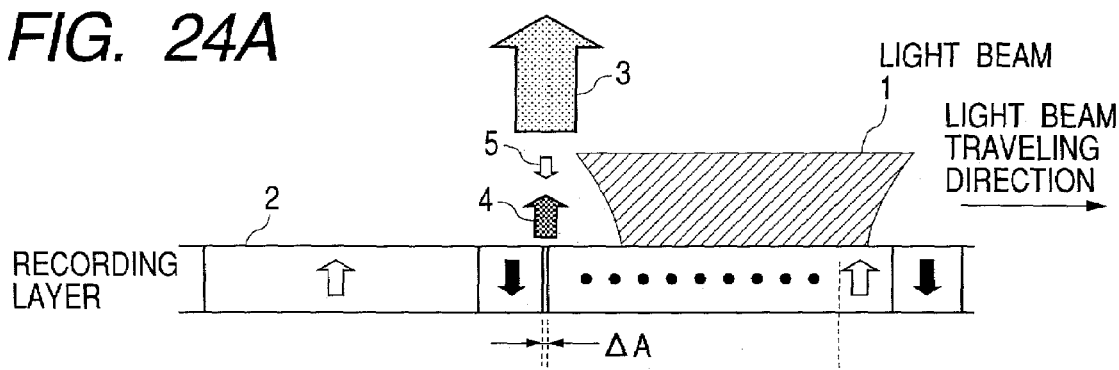
FIGS. 24A, 24B and 24C are diagrams for explaining a stray magnetic field.
Figure 24B:
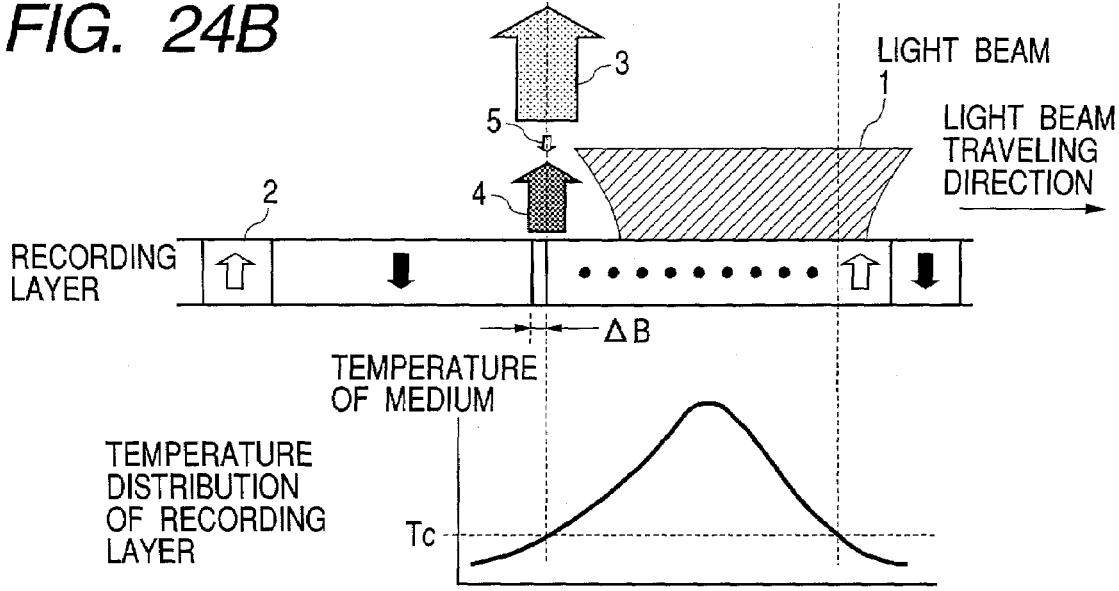
Figure 24C:
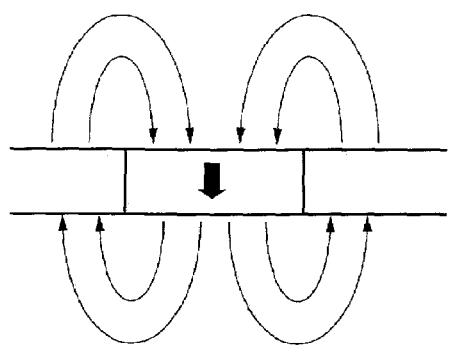

Additional explanation will be performed by using FIGS. 24A to 24C. FIG. 24A shows the case where the longest and shortest record marks among recorded codes are sequentially formed, and FIG. 24B shows the case where the shortest and longest record marks among recorded codes are sequentially formed. In FIGS. 24A to 24C, reference numeral 1 denotes a light beam, an arrow 2 shows a magnetization state of a recording layer of a magneto-optical recording medium, an arrow 3 shows the strength and direction of an applied magnetic field from the magnetic head, and an arrow 4 shows the strength and direction of a stray magnetic field by the magnetization state just before the formation of a magnetic domain wall. An arrow 5 shows the strength and direction of a stray magnetic field from the record mark located further ahead.

Here, according to the characteristics of a magneto-optical recording medium, the stray magnetic field in the direction shown by the arrow 4 is applied in the direction in which the applied magnetic field from the magnetic head is increased at the time of magnetic domain wall formation, and the stray magnetic field in the direction shown by the arrow 5 is applied in the direction in which the applied magnetic field from the magnetic head is decreased at the time of magnetic domain wall formation.

Hence, sums of the applied magnetic fields shown by the arrows 3 to 5 in the magnetic domain wall forming part differ in the cases in FIGS. 24A and 24B, and larger magnetic field strength is applied to a recording layer in the case in FIG. 24B. In consequence, the location of magnetic domain wall formation is shifted by $\Delta A$ from a certain reference location in the case in FIG. 24A and is shifted by $\Delta B$ in the case in FIG. 24B, and the relation between $\Delta A$ and $\Delta B$ results in $\Delta A < \Delta B$.

Furthermore, record mark length becomes small by adopting a magneto-optical record and reproduction method, which can eliminate restrictions of resolution of an optical system and can drastically improve track recording density, such as a magnetic domain wall movement-type magneto-optical medium. (1) Therefore, since the magnetization state in a certain range from the location of magnetic domain wall formation is further complicatedly changed and the stray magnetic field is also complicated, the edge shift by record mark length becomes complicated. (2) Since a ratio of the edge shift amount, which is caused by the above-described factor, to the mark length becomes large by record track density increasing and mark length becoming short, an edge shift problem by the stray magnetic field is manifested. (3) Since restrictions of the edge shift by inter-code interference caused by restrictions of resolution of an optical system is eliminated, the edge shift problem by the stray magnetic field is manifested.

In this embodiment, a waveform deviation occurring depending on record mark length on the basis of such a phenomenon is corrected. That is, as shown in Formula (3), a correction amount is computed from the present record mark length and a predetermined correction coefficient at the time of information reproduction, and the waveform deviation of a reproduced signal is corrected on the basis of this correction amount.

The waveform correction circuit 111 delays an RF digital signal supplied from the A/D converter 110, and corrects the RF digital signal on the basis of the correction amount Y, obtained from the correction amount generation circuit 116, and a signal F showing the direction of a change.

The outline of the correction is shown in FIG. 9. (A) of FIG. 9 shows a waveform of a reproduced signal, and each black circle ● shows a sampling point. In addition, a broken line in (A) of FIG. 9 is a waveform after correction, and each asterisk * shows a sampling point after the correction. (B) of FIG. 9 shows sampled values before correction and a binary-converted threshold, and (C) of FIG. 9 shows sampled valued after the correction and the binary-converted threshold. Although level determination at an identification point 501 is difficult and it becomes easy to generate an error in the case in (B) FIG. 9, as shown in (C) of FIG. 9, it becomes possible to increase the accuracy of the level determination by performing correction.

The waveform correction circuit 111 adds the correction amount Y to the sampled data near a changing point on the basis of the change direction F of the reproduced signal supplied from the correction amount generation circuit 116, when the change direction F is "1" (leading edge of the reproduced signal). In addition, when the change direction F is "0" (trailing edge of the reproduced signal), the sign of the correction amount Y is reversed, and it is added to the sampled data near the changing point.

The corrected RF digital signal is supplied to a decoder circuit 112. Here, the decoder circuit 112 performs decoding by binary conversion shown in FIG. 3.

As shown in FIG. 9, a decoding error due to a waveform deviation can be reduced by correcting a reproduced signal according to the mark length.

Figure 7A:
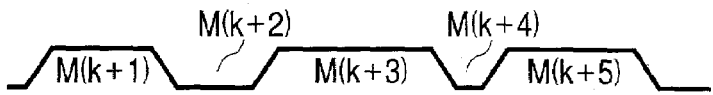
FIGS. 7A, 7B, 7C, 7D, 7E, 7F, 7G, 7H and 7I are timing charts for explaining the operation of the first embodiment.
Figure 7B:

Next, the specific reproduction operation of this embodiment will be explained on the basis of FIGS. 7A to 7I. FIG. 7A shows an RF digital signal, FIG. 7B shows a clock, FIG. 7C shows temporary determination data, FIG. 7D shows a mark length, FIG. 7E shows a jitter, FIG. 7F shows change direction, FIG. 7G shows a gate which sets a correction zone, FIG. 7H shows the amount of correction offsets, and FIG. 7I shows a digital signal after correction.

Here, when a light beam for reproduction is radiated from the optical head 104 onto the magneto-optical disk 101 which is rotating, the reflected light from the magneto-optical disk 101 is detected by the optical head 104 and a reproduced signal is generated, and the reproduced signal is supplied to the A/D converter 110 through a preamplifier 105 and an AGC circuit 109. The A/D converter 110, as shown in FIG. 7A, outputs an RF digital signal with synchronizing with the clock in FIG. 7B, and supplies the RF digital signal to the mark length detection unit 115.

Figure 7C:
Figure 7D:
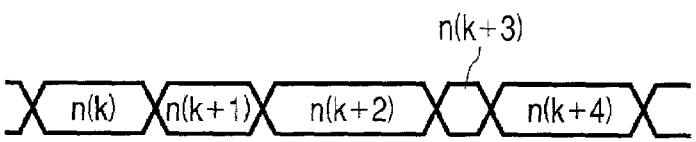
Figure 7E:
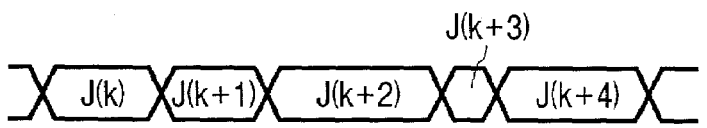
Figure 7F:
Figure 7G:
Figure 7H:
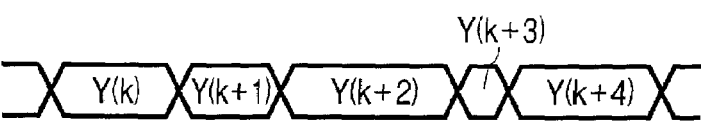
Figure 7I:

The mark length detection unit 115 generates temporary determination data as shown in FIG. 7C, and simultaneously computes the record mark length n on the basis of the counter not shown in the drawings, etc. Furthermore, the mark length detection unit 115 detects the change direction of leading and trailing edges from the temporary determination data in FIG. 7C, and outputs 1→0 as the change direction of the temporary determination data 1→0 or outputs 0→1 as the change direction of the temporary determination data 0→1, as shown in FIG. 7F.

In addition, an RF digital signal not shown in the drawings which is shifted by ½ clock phase to RF digital signal in FIG. 7A is supplied to the jitter detection unit 117. The jitter detection unit 117 detects a jitter in a rear edge of each mark from the RF digital signal whose phase is shifted, as shown in FIG. 7E. In addition, suffixes (k+1), (k+2), and the like given to the data in FIGS. 7A to 7I denote the data of the (k+1)th mark, (k+2)th mark, and the like, respectively. Hence, for example, the mark length n(k+1) in FIG. 7D denotes that it is the mark length corresponding to the mark M(k+1) of the RF digital signal in FIG. 7A.

The correction amount generation circuit 116 computes an average jitter every mark length on the basis of record mark length n in FIG. 7D and jitters in FIG. 7E, and further computes correction coefficients A and B in Formula (3). Next, a correction amount is computed by Formula (3), which is converted into the amplitude offset amount Y, and the offset amount Y shown in FIG. 7H is outputted.

The waveform correction circuit 111 gives predetermined delay to the RF digital signal obtained from the A/D converter 110, generates a correction gate, which controls a zone where the RF digital signal is corrected on the basis of a signal from the correction amount generation circuit 116 as shown in FIG. 7G inside, and adds or subtracts an offset to or from the amplitude of the RF digital signal in this correction gate zone. That is, with corresponding to an edge section of the RF digital signal, the correction gate signal in FIG. 7G is generated, and an offset is subtracted or added in the zone of "1" of this correction gate signal. Therefore, since the reproduced signal shown by a broken line in FIG. 7I is corrected into the reproduced signal shown by a solid line, the waveform deviation can be corrected.

In the apparatus according to this embodiment, since it generates a correction coefficient for reproduction compensation on the basis of user data that is reproduced, an optimal correction coefficient for a reproduced signal can be obtained. In addition, it is not necessary to record beforehand a special pattern for the reproduction compensation for using the user data, etc.

Furthermore, since the above-described correction coefficient is serially updated by the reproduction compensating circuit, it becomes possible to realize always optimal correction also to variation in time.

In addition, although jitters corresponding to all the mark lengths 2 to 8 generated in RLL (1, 7) code are held and a correction coefficient is obtained in the above-described embodiment, as a simplified method, it is also effective to obtain a correction amount in each mark length by linear approximation based on specific record mark lengths, for example, 2, 4, and 8 of jitters.

Figure 22:
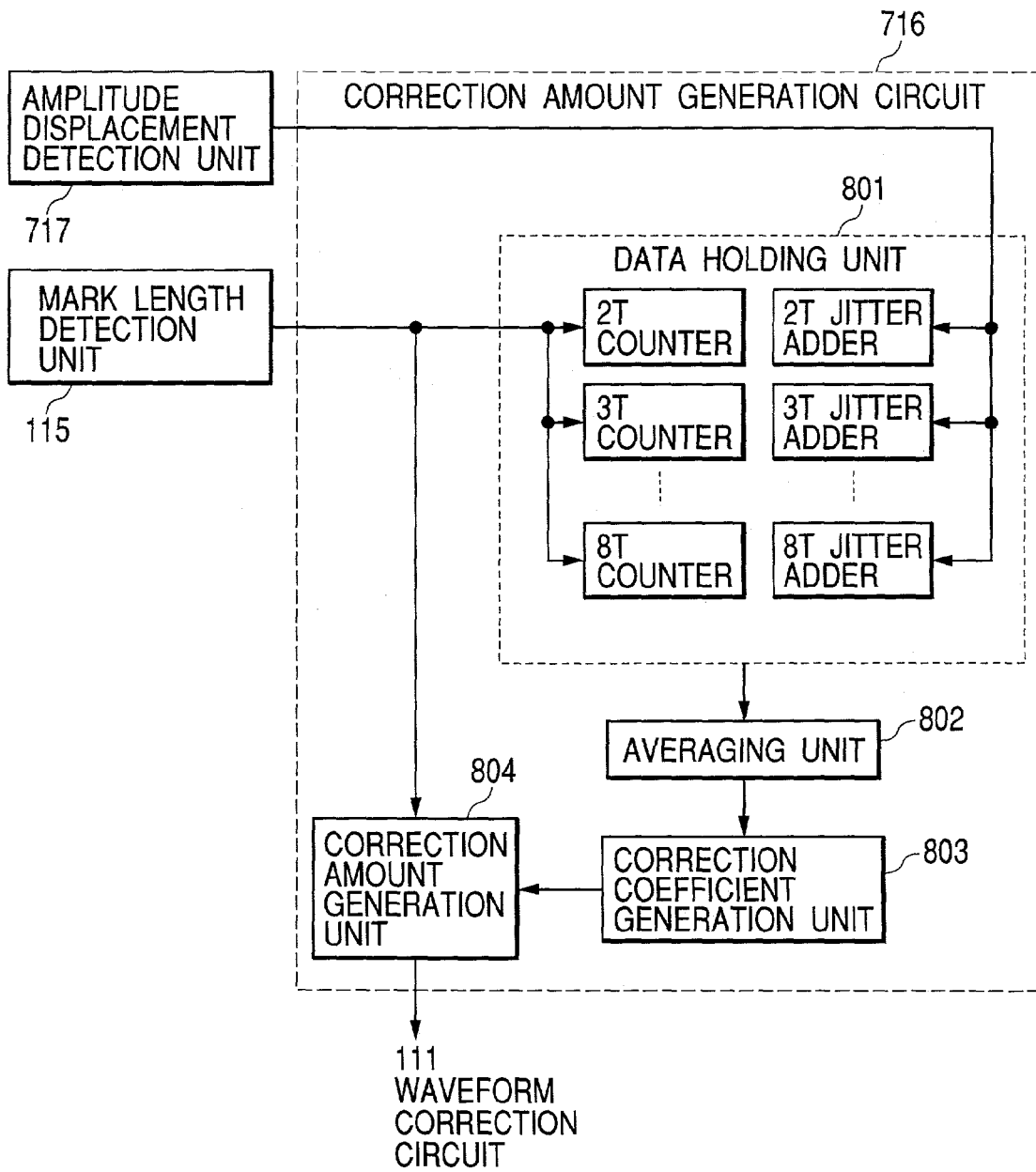
FIG. 22 is a block diagram showing another configuration of the first embodiment of a magneto-optical reproducing apparatus according to the present invention.

In the embodiment described above, the jitter (J) every mark length is obtained on the basis of the sampled data near the zero cross, an average of jitters every mark length is further calculated, correction coefficients A and B are computed on the basis of this average, a jitter J is generated by using the mark length n and the correction coefficients A and B, and the correction amount Y in the amplitude direction is computed. Alternatively, it is possible to obtain a sample value near the zero cross every mark length, obtain an average value for this sample value every mark length, calculate correction coefficient based on this average value, and calculate correction amount in an amplitude direction. FIG. 22 is a block diagram showing another configuration of the first embodiment of a magneto-optical reproducing apparatus according to the present invention. As shown in FIG. 22, this apparatus comprises: an amplitude displacement detection unit 717 which detects sampled data (open circles ○ in FIGS. 4A to 4C) near a zero cross as shown in FIGS. 4A to 4C as amplitude displacement; a data holding unit 801 which has a counter counting a frequency of appearance every mark length, and an adder adding amplitude in a rear edge section of each mark length, inside; an averaging unit 802 which calculates an average of amplitude every mark length; a correction coefficient generation unit 803 which computes a correction coefficient based on this average; and a correction amount generation unit 804 which computes the correction amount Y in the amplitude direction with respect to the mark length by using the mark length and correction coefficient.

(Embodiment 2)

Next, a second embodiment of the present invention will be explained. The second embodiment is characterized in the generation of a correction coefficient, the generation method of a correction amount, and a correction method in comparison with the above-mentioned embodiment.

FIG. 10 is a block diagram showing a second embodiment of the present invention. Similar portions as those in FIG. 1 have been assigned the same numerals, consequently, explanations of such portions have been omitted.

A mark length detection unit 130 in FIG. 10 temporarily determines a reproduced signal that is sampled by PR detection. A jitter detection unit 131 performs PR (1, −1) processing of a sampled RF digital signal 5, and detects a jitter in an edge section. A correction amount generation circuit 132 generates a correction amount of a reproduced signal based on the mark length and jitter. A waveform correction circuit 133 corrects sampled data near an edge of the RF digital signal 5 that is converted into a digital signal by the A/D converter 110. A decoder circuit 134 decodes data by PR detection based on the RF digital signal that is corrected. In addition, a well-known method such as a binary conversion, or PRML can be used as a decoding method. Hereafter, the detail of each part will be described.

A mark length detection unit 130 in FIG. 10 temporarily determines a reproduced signal that is sampled by PR detection. A jitter detection unit 131 performs PR (1, −1) processing of a sampled RF digital signal S, and detects a jitter in an edge section. A correction amount generation circuit 132 generates a correction amount of a reproduced signal based on the mark length and jitter. A waveform correction circuit 133 corrects sampled data near an edge of the RF digital signal S that is converted into a digital signal by the A/D converter 110. A decoder circuit 134 decodes data by PR detection based on the RF digital signal that is corrected. In addition, a well-known method such as a binary conversion, or PRML can be used as a decoding method. Hereafter, the detail of each part will be described.

Figure 11A:
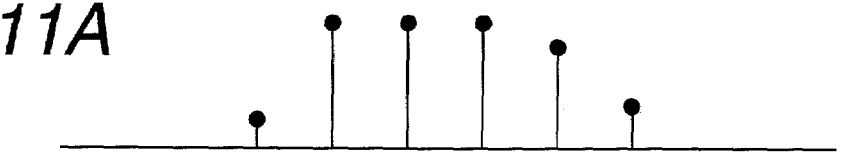
FIGS. 11A, 11B and 11C are diagrams for explaining PR detection of mark length detection in FIG. 10.
Figure 11B:
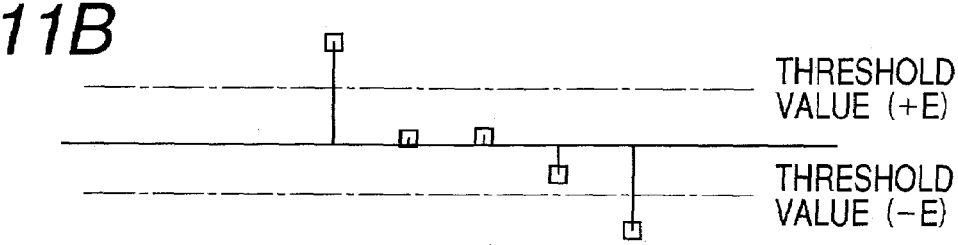
Figure 11C:
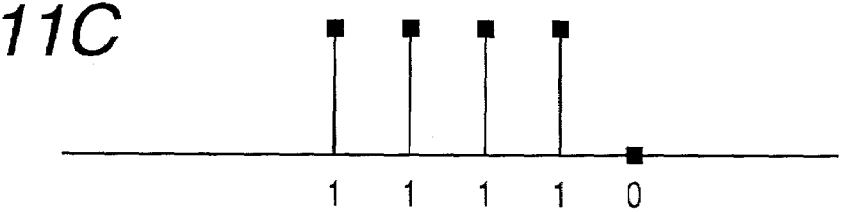

The mark length detection unit 130 serially performs the processing of subtracting sampled data S(k−1) at one previous time unit from sampled data S(k) at the present time unit with respect to the RF digital signal S. This processing is referred to as PR(1, −1) hereinafter. FIGS. 11A to 11C is the outline of PR(1,−1). FIG. 11A shows sampled data of an RF digital signal, FIG. 11B shows sampled data after PR(1, −1), and FIG. 11C shows data after temporary determination. As shown in FIG. 11B, sampled data other than that in an edge section becomes approximately zero by PR(1, −1), and there is a characteristic that a low-frequency variable component is removable. Positive and negative thresholds ±E is set in FIG. 11B, and under the following conditions temporary determination will be performed. In addition, sampled data after PR(1, −1) is referred to as Sd.

$$Sd > +E \rightarrow 1$$

$$Sd < -E \rightarrow 0$$

Except the above, the determination result at one previous time unit is held.

Temporary determination result is shown in FIG. 11C. A sampled data row in FIG. 11C is set to be "11110" as a result of the temporary determination. At this time, the mark length is detected by counting the number of continuous codes "1" or "0" by a counter, etc.

Figure 12A:
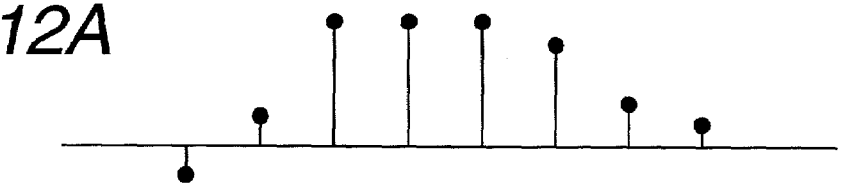
FIGS. 12A, 12B and 12C are diagrams for explaining the outline of the jitter detection in FIG. 10.
Figure 12B:
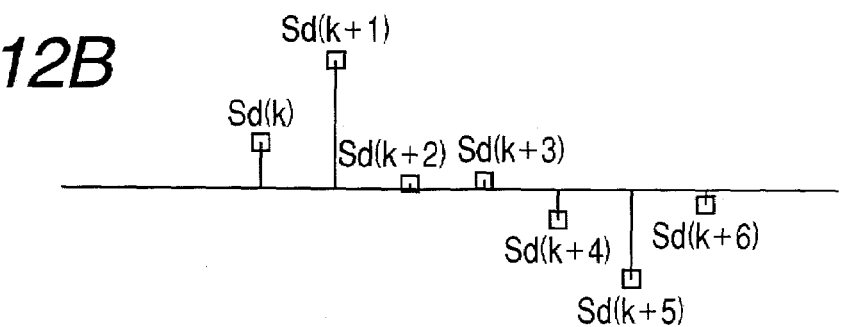
Figure 12C:
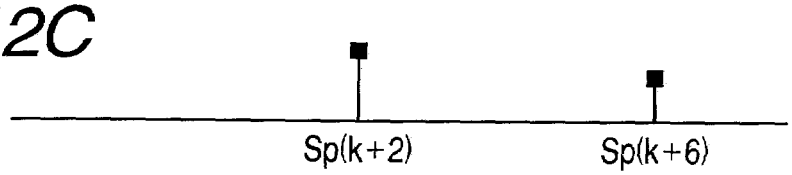

The Jitter detection unit 131 performs PR(1, −1) similarly to the above with respect to an RF digital signal. FIG. 12A shows the RF digital signal digitized by the A/D converter 110, FIG. 12B shows sampled data Sd after PR(1, −1), and FIG. 12C shows a phase error Sp in an edge section.

The jitter detection unit 131 sets a predetermined threshold with respect to the sampled data row Sd, and compares each sampled data Sd with the threshold. When the sampled data is larger than the threshold, it is determined that it is a leading edge section, and when the sampled data is smaller than the threshold, it is determined that it is a trailing edge section. A phase error Sp is generated on the basis of the sampled data Sd near the edge which is determined, as follows.

$$Sp(k) = Sd(k-2) - Sd(k) \quad (5)$$

Formula (5) expresses the difference between two points that sandwich the peak of the sampled data after PR(1, −1). When the phase coincides with that of the clock, Sp becomes zero, and Sp becomes negative when the phase advances, and becomes positive when the phase is delayed.

Figure 13A:
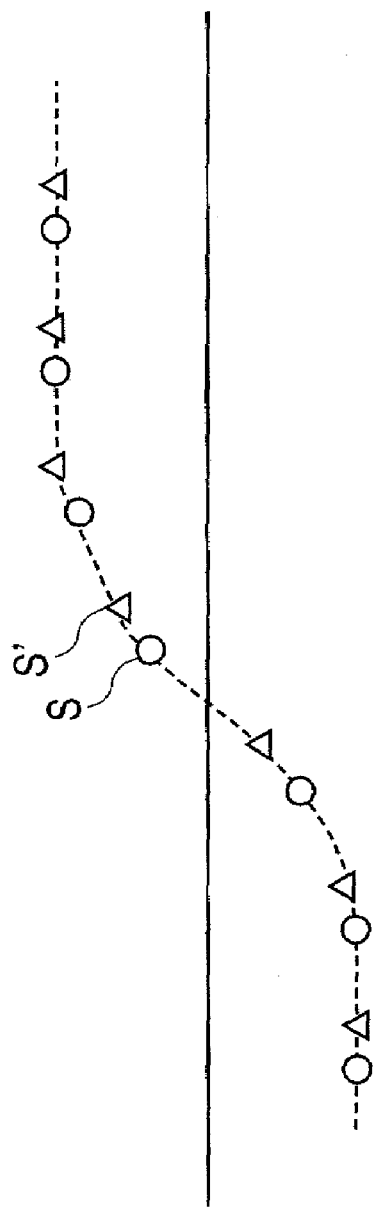
FIGS. 13A and 13B are diagrams for explaining the outline of the jitter detection in FIG. 10.
Figure 13B:
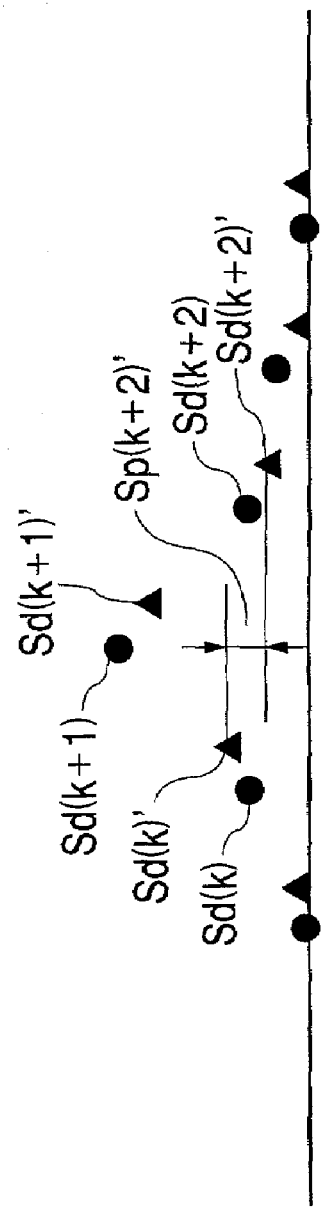

For example, as shown in FIG. 13A, an open circle ○ denotes the sampling value S of a reproduced signal at the time of the phase coinciding with that of the clock, and an open triangle Δ denotes the sampling value S' of the reproduced signal at the time of the phase being delayed. A predetermined threshold is set with respect to the sampled data row Sd (shown by a black circle ●) and Sd' (shown by a black triangle ▲) after PR(1, −1), and comparison of each sampled data Sd and Sd' with the threshold is performed. When the sampled data Sd and Sd' are larger than the threshold, it is determined that it is a leading edge section, and here, Sd(k+1) and Sd(k+1)' are determined as a leading edge section. As shown in FIG. 13B, Sp(k+2)=Sd(k)−Sd(k+2)=0 when the phases of the reproduced signal and clock is in agreement, and Sp(k+2)'=Sd(k)'−Sd(k+2)'>0 when the phase of the reproduced signal is delayed from that of the clock.

The phase error Sp(k+2) in FIG. 12C is a phase error obtained by two points which sandwich a peak Sd(k+1) of PR(1, −1), and the phase error Sp(k+6) is a phase error obtained by two points which sandwich a peak Sd(k+5). However, a sign of the phase error Sp obtained in a trailing edge section (when the above-mentioned peak value is negative) is reversed. Owing to this, as shown in FIG. 12C, it is possible to obtain phase error information in an edge section.

The jitter detection unit 131 converts the above-mentioned phase error information into the jitter J in a time-axis with the phase error-jitter conversion coefficient h obtained from a medium's characteristics or the characteristics of a record and reproduction system with respect to the phase error information as follows.

$$J = h \cdot Sp \quad (6)$$

Next, a correction amount generation circuit 132 will be described. The correction amount generation circuit 132 receives the information on a mark length and a jitter from the mark length detection unit 130 and the jitter detection unit 131.

In this embodiment, data for reproduction compensation is held by making the kth and (k+1)th mark lengths and a jitter at a rear edge of the (k+1)th mark be a set.

Figure 14:
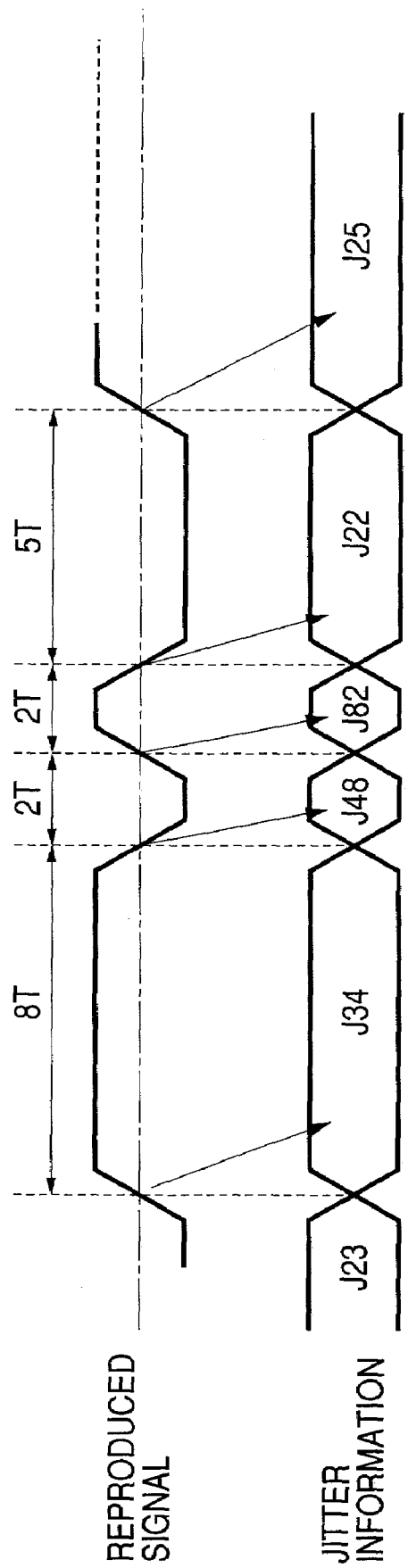
FIG. 14 is a diagram for explaining the generation of a correction amount in FIG. 10.

FIG. 14 shows the relation between the mark lengths detected in the mark length detection unit 130 and the jitter detected in the jitter detection unit 131 with respect to the reproduced signal. J82 in the jitter information in FIG. 14 shows a jitter in a rear edge of a 2T mark in the combination of mark lengths 8T-2T in the reproduced signal.

Figures 15, 16:
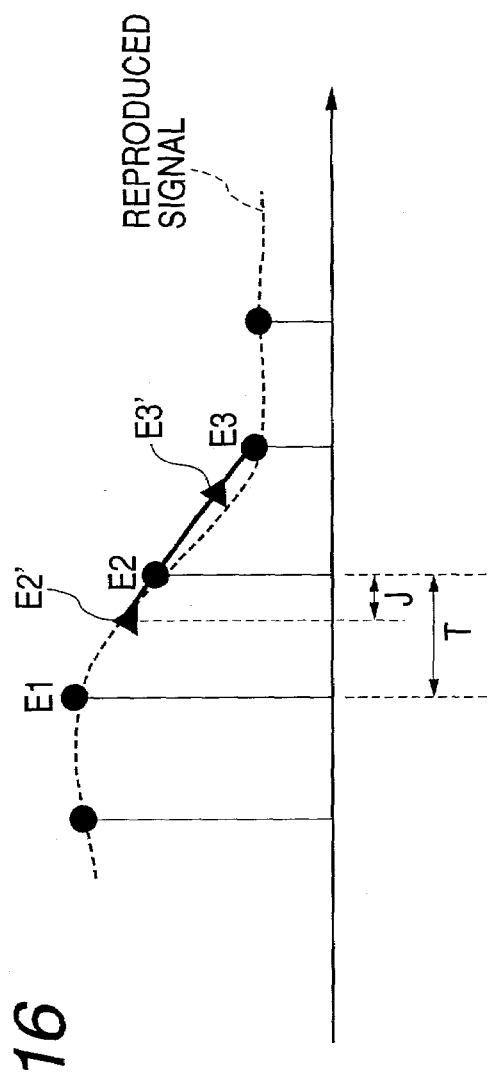
FIG. 15 is a diagram for explaining the correction amount in FIG. 10.
FIG. 16 is a diagram for explaining the waveform correction in FIG. 10.

The correction amount generation circuit 132 computes an average of jitters every combination of the kth and (k+1)th mark lengths, and holds it on the table shown in FIG. 15.

As update timing of a correction coefficient, in this embodiment, the correction coefficient is updated every logical data class (file unit etc.), or every class based on identification information (record time, date, etc.).

Next, the waveform correction of a reproduced signal will be described.

An RF digital signal digitized by the A/D converter 110 is supplied to the mark length detection unit 130. The mark length detection unit 130 detects the mark length from the sampled value of an RF digital signal as described above. Two detected mark lengths that are adjacent are supplied to the correction amount generation circuit 132. The correction amount generation circuit 132 calls a Jitter Jij (i: kth mark length, j: (k+1)th mark length) from the table shown in FIG. 15 based on two mark lengths, and supplies it to the waveform correction circuit 133.

As shown in FIG. 16, the waveform correction circuit 133 computes sampled data E2' and E3' that are corrected by linear interpolation from sampled data E1 to E3 and an interpolation coefficient G (=–J) in an edge section (shown by black squares ■). For example, E2' can be obtained by the following Formula (4).

From $(E2'-E2)/(E1-E2)=G/T$, $$E2'=(G/T)\cdot E1+((T-G)/T)\cdot E2 \qquad (7)$$

T denotes an interval between sampling clocks. In addition, although the case of linear interpolation is shown here, it is also possible to use another well-known interpolation method. Thereby, since the edge shift by a waveform deviation can be reduced, it becomes possible to eliminate a factor of a decoding error and to aim at improvement in recording density.

In this embodiment, since a signal after PR(1, –1) processing is used for the detection of the above-described jitter, the A/D converter for jitter detection in the first embodiment becomes unnecessary. In addition, even if a low frequency component of a reproduced signal fluctuates with cross talk under the influence of a record signal in an adjoining track, it is possible to perform stable reproduction processing since the low frequency component is suppressed by PR(1, –1).

(Embodiment 3)

Next, a third embodiment of the present invention will be explained. This embodiment is different from the second embodiment in a generation method of a correction amount in the correction amount generation circuit 132 in FIG. 10.

As described above, the size of a stray magnetic field changes with an interval between a magnetic domain wall formed immediately before and a magnetic domain wall which is going to be formed next, i.e., the record mark length to be formed, and the mark length located in front of it. Hence, the edge shift by a waveform deviation is influenced by the record mark length that is going to be formed, and the mark length located ahead of it.

Then, a correction amount J is generated with the following formula from the kth and (k+1)th mark lengths.

$$J=-A\cdot n(k)+B\cdot n(k+1) \qquad (8)$$

Here, n(k) is the kth mark length, and n(k+1) is the (k+1)th mark length.

Coefficients A and B in Formula (8) are computed by a method of least squares, etc. on the basis of collected sampled data by holding the sampled data every combination of adjacent mark lengths in FIG. 15. Therefore, in this embodiment, a table where the coefficients A and B are held is generated instead of the jitter J in each cell in FIG. 15.

A method of waveform correction, which is the same as that in the second embodiment, detects the adjoining mark lengths, calls the above-mentioned coefficients A and B from the table, and computes a correction amount with Formula (8). Hereafter, by correcting a waveform by the interpolation in the direction of a time axis, it becomes possible to reduce the edge shift by the waveform deviation.

In addition, it is possible to simplify the structure of a system by making the coefficients A and B equal to each other, i.e. A=B as the simplification of Formula (8). When the difference of the coefficients A and B is minute, simplification with this method is effective. Furthermore, it is also possible to simplify Formula (8) by generating a correction amount by using the mark length n(k+1) in present time by making the coefficient A zero. It becomes unnecessary to hold the mark length ahead of it.

(Embodiment 4)

Figure 17:
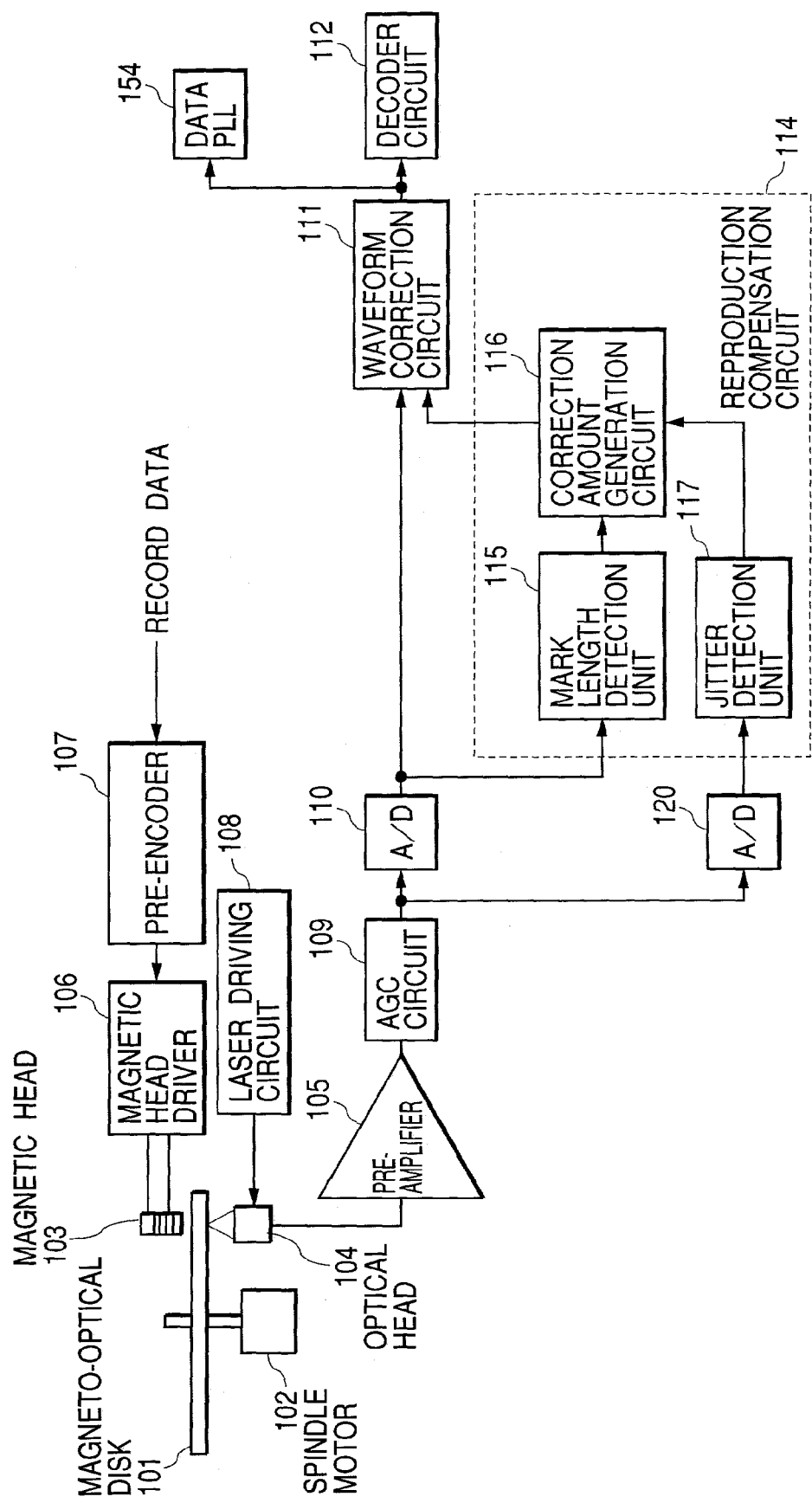
FIG. 17 is a block diagram showing a fourth embodiment of the present invention.

Next, a fourth embodiment of the present invention will be explained. FIG. 17 is a block diagram showing the fourth embodiment of the present invention. In FIG. 17, a data PLL 154 is added to the structure in FIG. 1. Others are similar to those in FIG. 1. The data PLL 154 generates a clock signal based on the reproduced signal by which a waveform deviation is corrected in the waveform correction circuit 111 by the same method as that in the first embodiment.

Figure 18:
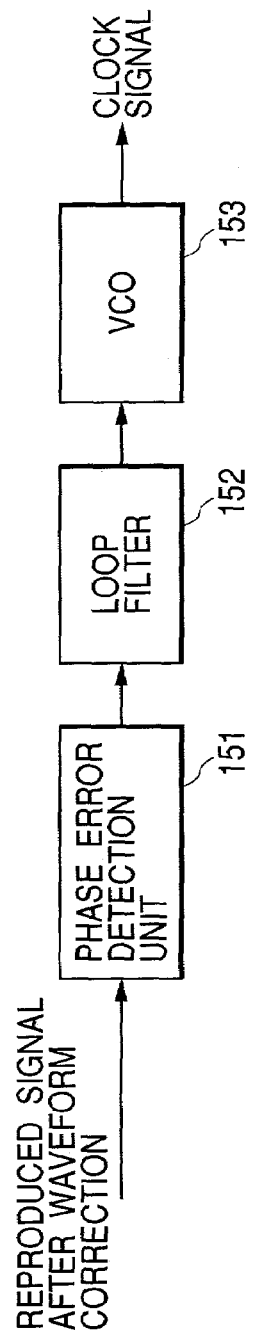
FIG. 18 is a diagram for explaining data PLL in FIG. 17.

FIG. 18 is a block diagram showing the configuration of the data PLL 154. In this figure, a phase error detection unit 301 detects a phase error based on sampled data in a leading edge section of a reproduced signal. A loop filter 302 performs removal of unnecessary noise from and reduction compensation of a phase error signal. A VCO 303 generates a clock signal with a frequency corresponding to a control voltage. The data PLL detects a phase error from the edge section of a reproduced signal and supplies the detected signal as a control signal of the VCO after filtering. By making this a loop, it is possible to obtain the clock synchronizing with the reproduced signal.

Figure 42A:
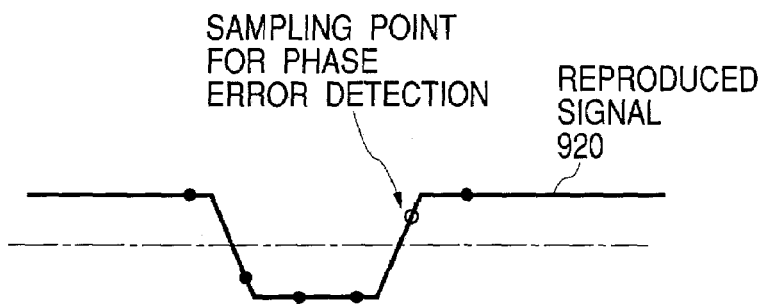
FIGS. 42A, 42B, 42C and 42D are diagrams for explaining phase error detection in the data PLL.
Figure 42B:
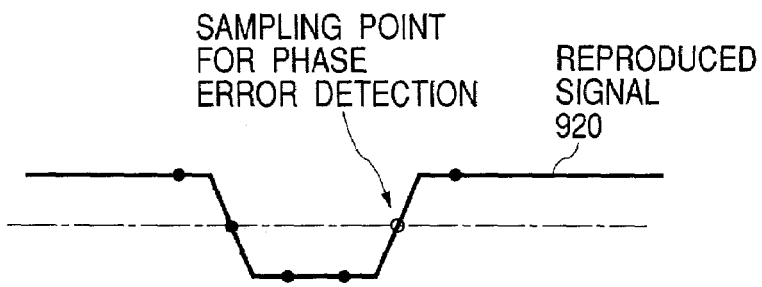
Figure 42C:
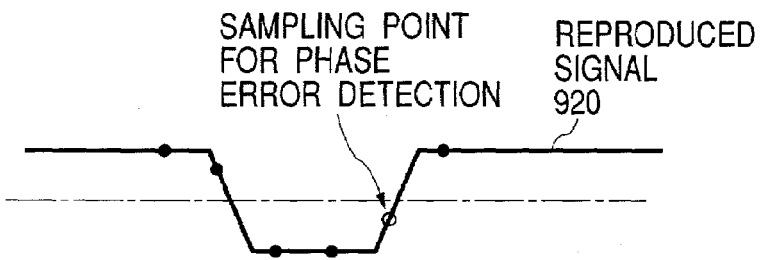
Figure 42D:
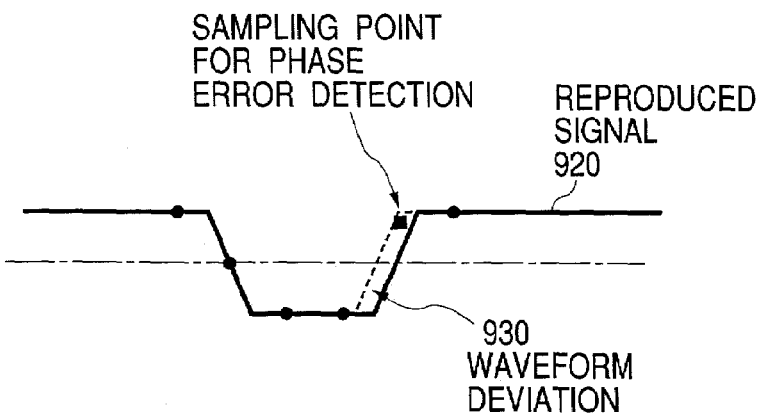

In the apparatus of this embodiment, since a phase error is detected from the reproduced signal which corrects waveform deviation, the influence of incorrect detection as shown in FIG. 42D can be reduced, and a proper reproduced signal can be obtained. Owing to this, it is possible to suppress out-of-locking by an error signal, etc. in a PLL loop, and to stabilize operation since the variation of the clock by an error is decreased. In addition, a detection method of a phase error is not limited to the above-described method, but another well-known technology can be used.

Furthermore, in this embodiment, a form of a recording medium is not limited to the form of a disk, but it may be, for example, a card. In this case, a record mark is arranged in a line, and information can be reproduced by linearly moving the card and the reproducing head relatively.

(Embodiment 5)

Figure 25:
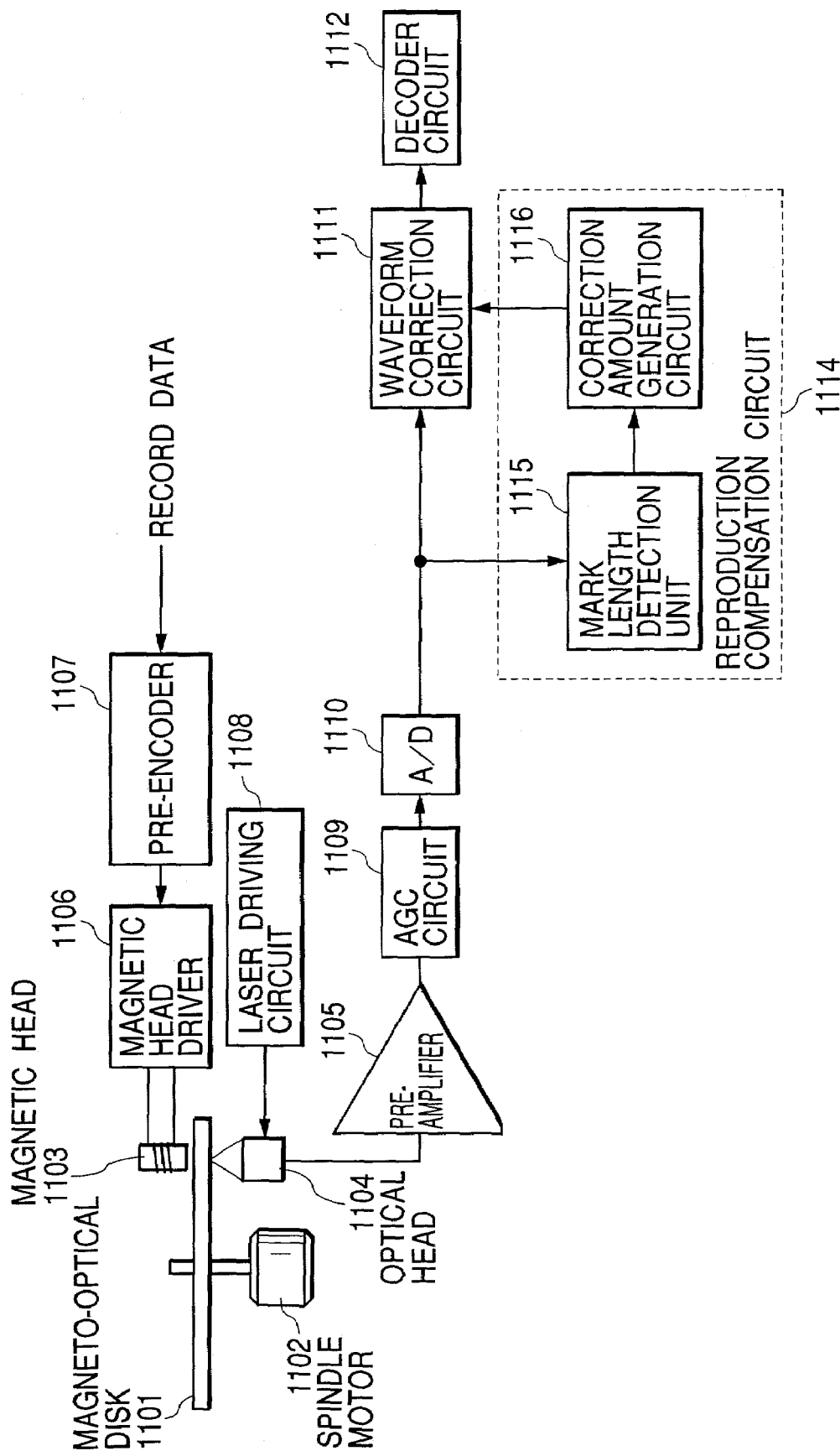
FIG. 25 is a block diagram showing a fifth embodiment of the present invention.

FIG. 25 is a block diagram showing the configuration of a fifth embodiment of a magneto-optical reproducing apparatus according to the present invention. In FIG. 25, a magneto-optical disk 1101 is an information recording medium, and a spindle motor 1102 rotates the magneto-optical disk 1101 at a predetermined speed. A magnetic head 1103 for generating a magnetic field modulated according to a record signal is arranged above the top face of the magneto-optical disk 1101, and an optical head 1104 is arranged with opposing the magnetic head 1103 below the bottom face the disk.

The optical head 1104 radiates a light beam for recording, and records information, or radiates the light beam for reproduction, detects the reflected light from the medium, and reproduces recorded information. At this time, a semiconductor laser (not shown in the drawings) that is a light source for record and reproduction, and a photosensor (not shown in the drawings) that detects light reflected from a medium is provided in the optical head 1104. The semiconductor laser is driven by laser drive circuit 1108, and recording and reproduction of information are performed by controlling a light beam of the semiconductor laser for recording or reproduction. Moreover, as the magneto-optical disk 1101, a magnetic domain wall motion-type magnet-optical medium is used, and information reproduction by magnetic domain wall motion is performed.

In the case of informational recording, the magneto-optical disk 1101 is rotated as a predetermined rate by the spindle motor 1102, and recording data is supplied to the pre-encoder 1107 in this state.

In the pre-encoder 1107, for example, an NRZI series of data modulation is performed. A modulated signal outputted from the pre-encoder 1107 is supplied to a magnetic head driver 1106, and the magnetic head driver 1106 drives the magnetic head 1103 for external magnetic field generation according to the modulated signal. Thereby, the magnetic head 1103 generates a magnetic field according to the modulated signal, and applies it to the magneto-optical disk 1101. Simultaneously, data is recorded on the magneto-optical disk 1101 with the light beam for recording from optical head 1104 by the driving signal from the laser drive circuit 1108.

On the other hand, in the case of informational reproduction, similarly, the magneto-optical disk 1101 is controlled to rotate at the predetermined rate, and the light beam for reproduction is radiated on the magneto-optical disk 1101 from the optical head 1104. The reflected light from the magneto-optical disk 1101 is detected by a photosensor of the optical head 1104, and an RF signal is generated. This RF signal is supplied to the AGC circuit 1109 through the preamplifier 1105, the AGC circuit 1109 performs gain control according to the RF signal to generate an RF signal with a predetermined amplitude.

The reproduced RF signal processed by the AGC circuit 1109 is converted into a digital signal by the A/D converter 1110.

The RF digital signal converted into the digital signal is supplied to a waveform correction circuit 1111 and a reproduction compensating circuit 1114. The reproduction compensating circuit 1114 comprises a mark length detection circuit 1115 and a correction amount generation circuit 1116, detects the record mark length of data from the RF digital signal, and generates a waveform deviation correction signal corresponding to each record mark length. The waveform correction circuit 1111 corrects the RF digital signal based on the waveform deviation correction signal supplied from the reproduction compensating circuit 1114.

The corrected RF digital signal is outputted to a decoder circuit 1112, and the decoder circuit 1112 outputs decoded data by differential detection. In addition, here, although the decoded data is generated by the differential detection, well-known decoding methods such as PRML and a bit-by-bit method can be used.

Figure 26:
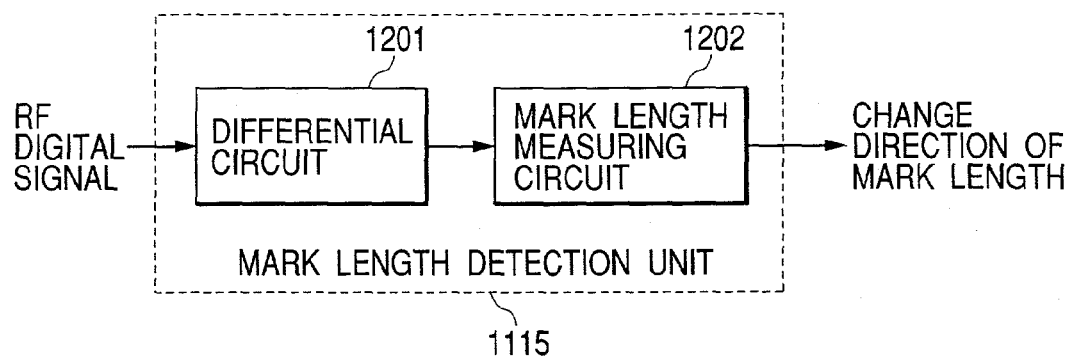
FIG. 26 is a block diagram showing a pattern detection circuit in FIG. 25.

Next, the operation of reproduction compensation of a waveform deviation that is a characteristic of this embodiment will be described. The reproduction compensating circuit 1114 comprises a mark length detection circuit 1115 and a correction amount generation circuit 1116. The configuration of the mark length detection circuit 1115 is shown in FIG. 26. In FIG. 26, a finite difference circuit 1201 outputs a differential value of the RF digital signal. A mark length measurement circuit 1202 measures an interval of a mark and a space as record mark length. Its operation will be described with referring to FIGS. 40A to 40C.

Figure 40A:
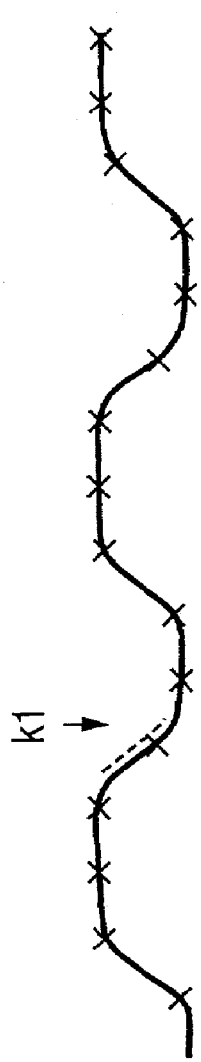
FIGS. 40A, 40B and 40C are diagrams for explaining a waveform deviation of a conventional reproduced signal.
Figure 40B:
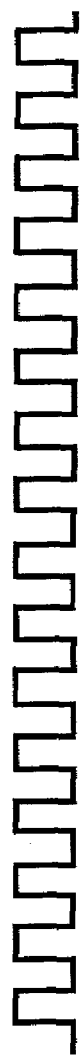
Figure 40C:
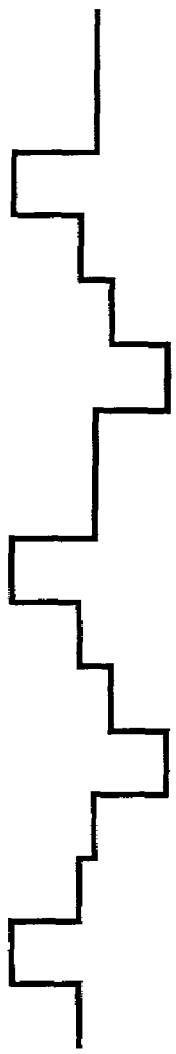

First, it is assumed that a reproduced waveform is, for example, a signal as shown in FIG. 40A. This is sampled with the clock generated by the PLL circuit not shown in the drawings, and is supplied from A/D converter 1110 as a discrete digital signal. A mark "X" in FIG. 40A, as described above, denotes a sampling signal. A differential circuit 1201 generates a differential signal from the RF digital signal supplied from the A/D converter 1110. This differential signal is obtained by subtracting a signal value, sampled before one time unit, from a current sampled signal value, and, the generated differential signal has a signal waveform shown in FIG. 40C.

Figure 27:
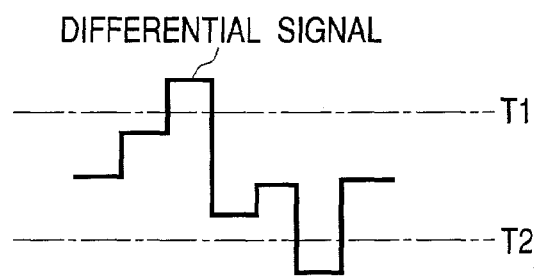
FIG. 27 is a chart for explaining the three-valued determination for a differential signal.

A differential signal generated by the differential circuit 1201 is supplied to the mark length measurement circuit 1202, and the mark length measurement circuit 1202 performs three-valued determination with respect to the differential signal. Specifically, as shown in FIG. 27, positive and negative thresholds T1 and T2 are set to the differential signal d(k), and determination is performed by the following method.

$d(k) \geq T1 \rightarrow \text{"1"}$ $d(k) \leq T2 \rightarrow \text{"-1"}$

Other than the above $\rightarrow \text{"0"}$

In the mark length measurement circuit 1202, three-valued determination of a differential signal is performed by the above-described method, and, in the section where determination result is "0", a counter value of an internal counter is incremented with synchronizing with a clock (which is a clock generated by the PLL loop). Since a leading edge or a trailing edge of a reproduced signal is detected when determination result changes to "0" from "1" or "-1", a counter value at that time is outputted. Record mark length P becomes a value obtained by adding +1 to the outputted counter value. The mark length measurement circuit 1202 performs the measurement of the record mark length in this way, resets the counter after outputting the record mark length, and measures the next record mark length.

Figure 28:
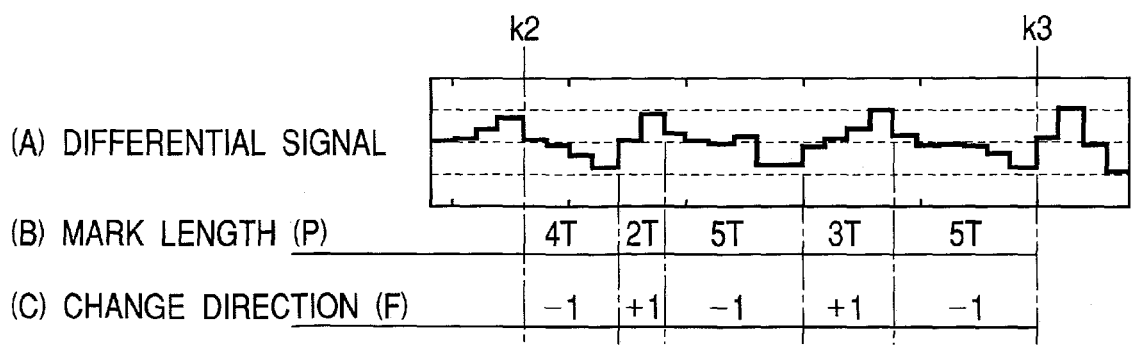
FIG. 28 is a drawing for explaining the operation of pattern detection.

In addition, assuming that a signal expressing the direction of a change of a leading edge or a trailing edge is F, the mark length detection circuit 1115 outputs "F=1" to the correction amount generation circuit 1116 as a leading section when the above-described determination result changes from "1" to "0", and outputs "F=0" to the circuit 1116 as a trailing section when changing from "-1" to "0". Here, for example, when the mark length detection circuit 1115 performs mark length detection in a time zone k2 to k3 of a differential signal as shown in (A) of FIG. 28, a record mark length (pattern interval) P as shown in (B) of FIG. 28 can be obtained. Moreover, (C) of FIG. 28 shows the change direction F.

The correction amount generation circuit 1116 generates a correction amount by the following formula (9) based on the signal supplied from the mark length detection circuit 1115.

$$Y(i) = -A \cdot P(i-1) + B \cdot P(i) \tag{9}$$

A and B are the predetermined correction coefficients set beforehand, P(i) is the record mark length at present time unit, and P(i-1) denotes the record mark length at one previous time unit. That is, the present record mark length and the record mark length at one previous time unit are multiplied by the predetermined correction coefficient, respectively, and the correction amount is computed by adding the values.

Here, in magneto-optical recording, the temperature of a laser beam irradiation section of a magneto-optical recording medium reaches to a Curie point by irradiation of a laser beam at the time of record, and magnetization disappears. However, at the peripheral section where temperature is not rising to a Curie point, magnetization exists and a stray magnetic field caused by the magnetization exists. Although a magnetic domain wall which is a record mark edge is formed in a rear edge in the light beam traveling direction, those stray magnetic fields act in the state that they are superimposed on the modulation magnetic field applied by the magnetic head from the outside for magnetic domain wall formation, at the time of the magnetic domain wall formation which is a record mark edge. The size of this stray magnetic field changes with the interval between a magnetic domain wall formed immediately before and a magnetic domain wall which is going to be formed next, i.e., the record mark length to be formed, and the mark length located in front of it. Therefore, the intensity of a stray magnetic field that acts on a magnetic domain wall forming section changes with a mark length (or mark length row) to be recorded.

In addition, the formed location of a magnetic domain wall is determined in the relation between temperature and magnetic field strength. Here, since the laser beam intensity and the magnetic field strength applied from the magnetic head are kept in a steady state and the stray magnetic field intensity that is superimposed differs if a record mark length or a record mark length row differs, the magnetic field strength applied to a location of magnetic domain formation is stray magnetic field intensity in addition to the magnetic field strength from the magnetic head. Hence, the magnetic field strength substantially applied to a magnetic domain forming part changes with the record mark length or record mark length row to be formed. In consequence, a phenomenon that a location of magnetic domain wall formation is changed by record mark length appears.

In this embodiment, a waveform deviation occurring depending on the record mark length based on such a phenomenon is corrected. That is, as shown in Formula (9), the record mark length at one previous time unit and the record mark length at present time unit are multiplied by the predetermined correction coefficients, respectively at the time of information reproduction, addition of their values is computed as the correction amount, and the waveform deviation of the reproduced signal is corrected on the basis of this correction amount. In addition, as for the correction coefficients A and B in Formula (9), it is desirable to obtain them beforehand by an experiment, for example, it may be read after it was recorded beforehand on a control truck of a disk at the time of shipment of a recording medium, or it may be read after it was written in ROM of an apparatus.

The waveform correction circuit 1111 delays an RF digital signal supplied from the A/D converter 1110, and corrects the RF digital signal based on the correction amount Y and a signal F showing the direction of a change, obtained from the correction amount generation circuit 1116. The outline of the correction is shown in FIGS. 29A to 29C. FIG. 29A shows a waveform of a reproduced signal, and a black circle ● denotes a sampling point. In addition, a broken line in FIG. 29A is a waveform after correction, and each asterisk * shows a sampling point after the correction. FIG. 29B shows a differential signal before correction, and FIG. 29C shows a differential signal after the correction.

The waveform correction circuit 1111 computes an offset amount S of signal amplitude based on the correction amount Y, subtracts the offset amount S near a changing point when the changing direction F is "1" (when the reproduced signal falls), and adds the offset amount S near a changing point when the changing direction F is "0" (when the reproduced signal rises). The offset amount S is obtained from $S=K \cdot Y(i)$. In addition, k is a coefficient. The corrected RF digital signal is supplied to the decoder circuit 1112. Here, the decoder circuit 1112 performs decoding by differential detection.

FIG. 30A shows a differential signal with respect to the corrected RF digital signal, and FIG. 30B shows decoded data. In the differential detection, "1" is outputted when a differential signal is equal to or larger than the positive threshold T1, "0" is outputted when equal to or less than the negative threshold T2, and in other cases a value that is the same as that of decoded data at one previous time unit is outputted. It is possible to reduce a decoding error by a waveform deviation by performing such correction.

Figure 31A:
FIGS. 31A, 31B, 31C, 31D, 31E, 31F, 31G and 31H are timing charts for explaining the operation of a fifth embodiment.
Figure 31B:
Figure 31C:
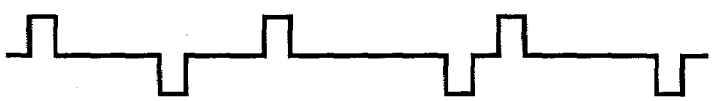
Figure 31D:
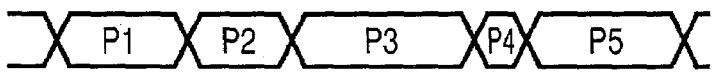
Figure 31E:
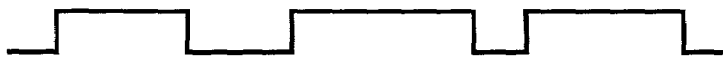
Figure 31F:
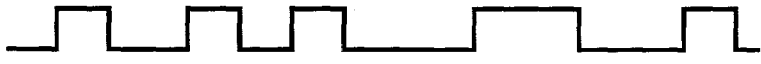
Figure 31G:
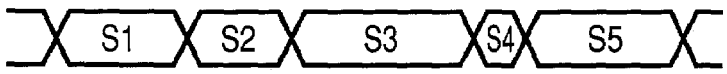
Figure 31H:
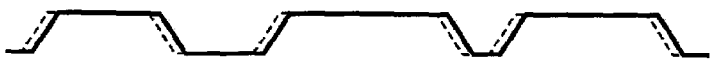

Next, the specific reproduction operation of this embodiment will be explained on the basis of FIGS. 31A to 31H. FIG. 31A shows an RF digital signal, FIG. 31B shows a clock, FIG. 31C shows a differential signal, FIG. 31D shows a mark length, FIG. 31E shows a change direction, FIG. 31F shows a gate of setting a correction zone, FIG. 31G shows a correction offset amount, FIG. 31H shows a digital signal after correction. Here, when a light beam for reproduction is radiated from the optical head 1104 on the magneto-optical disk 1101 which is rotating, the reflected light from the magneto-optical disk 1101 is detected by the optical head 1104 and a reproduced signal is generated, and the reproduced signal is supplied to the A/D converter 1110 through a preamplifier 1105 and an AGC circuit 1109. The A/D converter 1110, as shown in FIG. 31A, outputs an RF digital signal with synchronizing with the clock in FIG. 31B, and supplies the RF digital signal to the mark length detection circuit 1115.

The mark length detection circuit 1115 generates a differential signal as shown in FIG. 31C, and simultaneously computes the record mark length P on the basis of the counter value synchronized with the clock in FIG. 31B. Furthermore, the mark length detection circuit 1115 detects the change direction of leading and trailing edges from the differential signal in FIG. 31C, and outputs 0→1 as the change direction of the differential signal 1→0 or outputs 1→0 as the change direction of the differential signal −1→0, as shown in FIG. 31E.

The correction amount generation circuit 1116 computes a correction amount by Formula (9) based on the record mark length P in FIG. 31D, further converts it into the offset amount S of amplitude, and outputs the offset amount S as shown in FIG. 31G. The waveform correction circuit 1111 gives predetermined delay to the RF digital signal obtained from the A/D converter 1110, as shown in FIG. 31F, internally generates a correction gate, which controls a section where the RF digital signal is corrected on the basis of the signal from the correction amount generation circuit 1116, and subtracts or adds an offset from or to the amplitude of the RF digital signal in this correction gate section, respectively. That is, the waveform correction circuit 1111 creates a correction gate signal, which is shown in FIG. 31F with corresponding to an edge section of the RF digital signal, and performs addition or subtraction of an offset in the section where this correction gate signal is "1". Thereby, since the reproduced signal shown by a broken line is corrected into the reproduced signal shown by a solid line as shown in FIG. 31H, the waveform deviation can be corrected.

(Embodiment 6)

Figure 32:
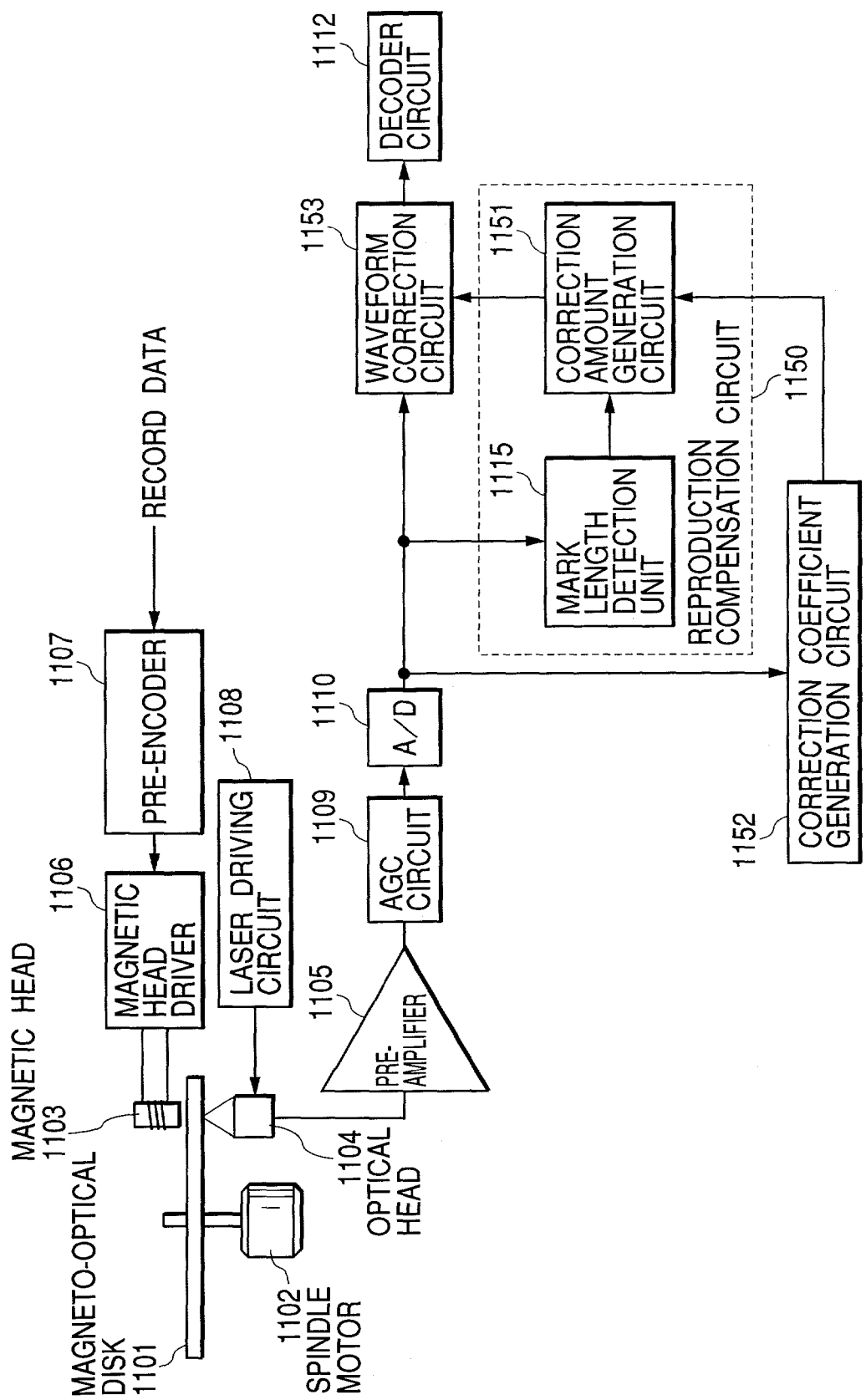
FIG. 32 is a block diagram showing a sixth embodiment of the present invention.

Next, a sixth embodiment of the present invention will be explained. The sixth embodiment adaptively generates the above-mentioned correction coefficient from a reproduced signal, and flexibly corresponds to a fluctuation of the correction coefficient due to the individual difference of a medium. In addition, waveform correction is also performed with a method different from that in the sixth embodiment. FIG. 32 is a block diagram showing a second embodiment of the present invention. In addition, the explanation of features similar to those shown in FIG. 25 will be omitted inasmuch as they are identified by the same reference numerals.

In FIG. 32, a correction coefficient generation circuit 1152 adaptively generates correction coefficients A and B in Formula (9). In addition, a reproduction compensating circuit 1150 generates a correction amount Y based on the record mark length generated by the mark length detection circuit 1115, and supplies it to a waveform correction circuit 1153. Here, the correction amount generation circuit 1151 generates a correction amount by using the correction coefficients A and B that are generated in the correction coefficient generation circuit 1152. The waveform correction circuit 1153 corrects and outputs the sampled data near an edge section based on the correction amount Y supplied from the correction amount generation circuit 1151.

Figure 33:
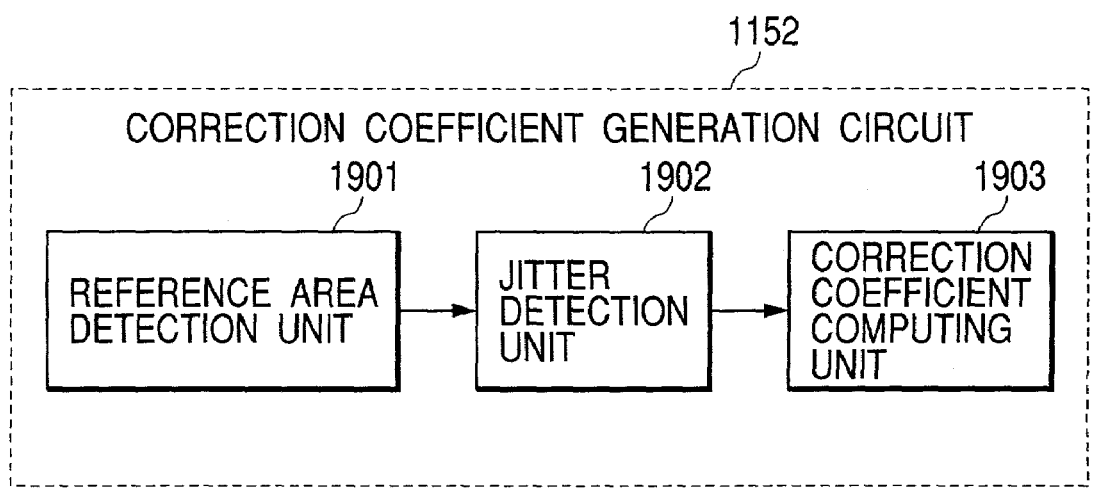
FIG. 33 is a block diagram showing a correction coefficient generation circuit in FIG. 32.

Next, the configuration and operation of each of the above-described units will be described. FIG. 33 is a block diagram showing the configuration of a correction coefficient generation circuit 1152. In FIG. 33, a reference area detection unit 1901 detects the area where the predetermined record mark row for generating a correction coefficient is recorded, and starts the sequence for generation of a correction coefficient. The record mark row shall be recorded on the predetermined area set beforehand.

When a correction coefficient is generated, an RF digital signal controlled and reproduced so that the signal in a predetermined address may be reproduced by a CPU not shown in the drawings or the like is supplied to the reference area detection unit 1901 through the A/D converter 1110. When detecting a predetermined record mark row from the RF digital signal, the reference area detection unit 1901 starts generation processing of the correction coefficient. As for the detection of a record mark row, it is possible to use well-known methods such as the above-mentioned differential detection and PRML.

Figure 34:
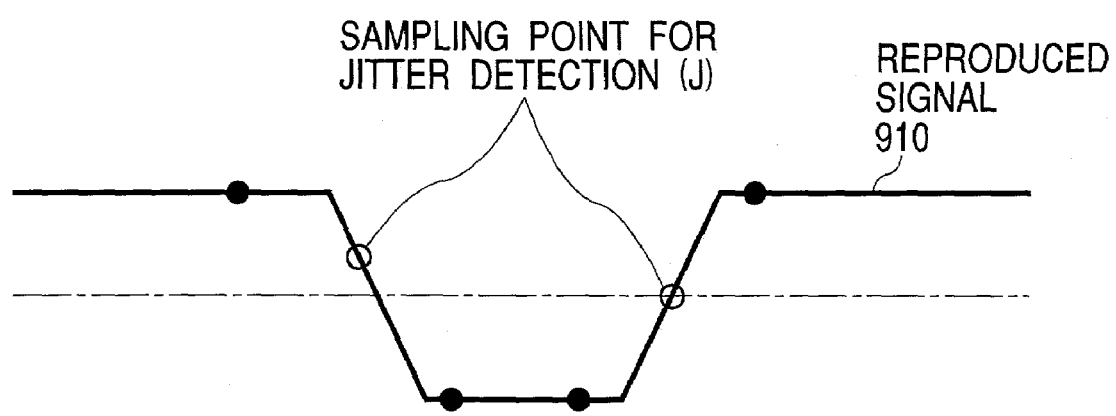
FIG. 34 is a chart for explaining phase difference detection in FIG. 32.

The jitter detection unit 1902 computes a jitter by reproducing a predetermined record mark row, and generates a correction coefficient based on this. The operation of the jitter detection unit 1902 will be described with FIG. 34. In FIG. 34, black circles ● and open circles ○ are sampling points of a reproduced signal 1910 with a PLL clock. The jitter detection unit 1902 acquires sampled data in an edge section as a phase error signal based on the signal from the reference area detection unit 1901, and 25 detects a jitter based on this sampled data.

Next, the operation of jitter detection will be described on the basis of FIGS. 35A to 35D. FIG. 35A shows a reproduced signal (signal pattern) for the jitter detection, FIG. 35B shows a PLL clock, FIG. 35C shows a differential signal of the reproduced signal, and FIG. 35D shows a phase error signal obtained from the sampled data at points of open circle ○ shown in FIG. 34. The jitter detection unit 1902 detects leading and trailing edges of a signal pattern shown in FIG. 35A by the differential signal in FIG. 35C, and as shown in FIG. 34, generates a phase error signal (D) from the gate section generated based on the differential signal.

Subsequently, the jitter detection unit 1902 selects the phase error signal obtained with the combination of a further specific record mark row out of the generated phase error signal, and generates a jitter signal. For example, in the predetermined record mark row of 8T-2T-2T-8T as shown in FIG. 35A, phase error signals J3 and J4 obtained in an edge section of a 2T pattern after 8T are selected. Since detection of a signal pattern is performed in the above-mentioned reference area detection unit 1901, an 8T-2T pattern can be obtained from the detection result.

Figure 36:
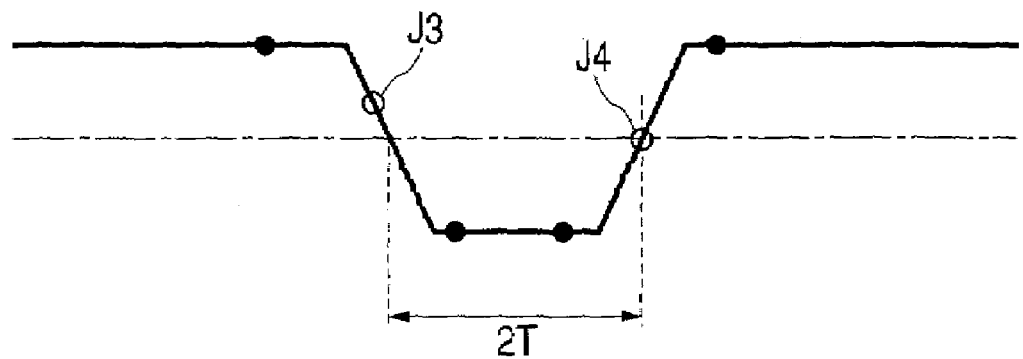
FIG. 36 is a diagram for explaining the outline of the jitter detection in FIG. 32.

The jitter detection can be performed from addition of the phase error signals J3 and J4 in trailing and leading sections of the 2T pattern, as shown in FIG. 36. The added value of J3 and J4 becomes "0" when there is no waveform deviation, but when the length of the 2T pattern is fluctuated by the waveform deviation, the added value fluctuates between plus and minus sides. The jitter detection unit 1902 generates a jitter signal in a specific pattern from a predetermined record mark row as shown in the above-described example, and computes an average value.

The correction coefficient calculation unit 1903 computes correction coefficients in Formula (1) from the generated jitter signal. Here, the correction coefficients A and B are obtained by Formula (10) with a function K showing the relation of (jitter signal)–(correction coefficient) which is beforehand obtained from the characteristics of a medium, etc.

$$\text{Correction coefficient } A = K_A(Jt), B = K_B(Jt) \quad (10)$$

Jt is a jitter signal obtained in the jitter detection unit 1902. In addition, it may be also possible to obtain an effect of the same extent even if correction coefficients A and B are equal to each other in Formula (9), and in that case, it is also possible to compute only the correction coefficient A in Formula (10), and to reduce the load of processing. The generated correction coefficient is supplied to the correction amount generation circuit 1151 in the reproduction compensating circuit 1150.

Figure 37:
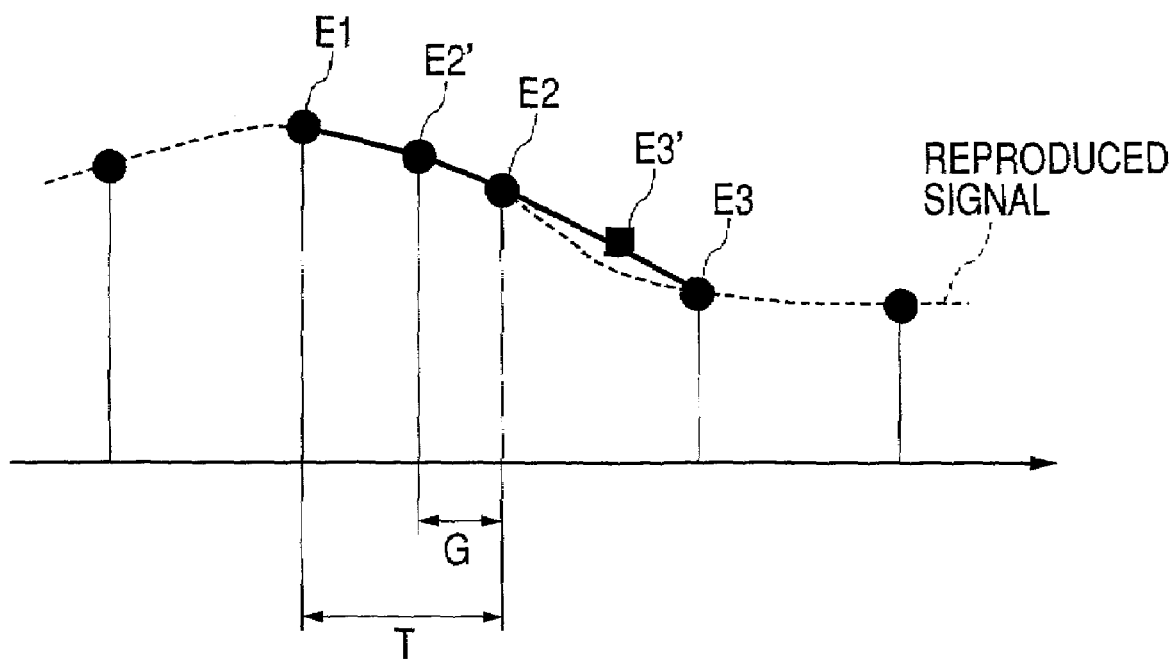
FIG. 37 is a diagram for explaining the correction processing of a waveform correction circuit in FIG. 32.

FIG. 37 shows the outline of waveform correction in the sixth embodiment. The interpolation of a signal realizes the correction of a waveform in this embodiment. FIG. 37 shows a signal near an edge of a reproduced signal. A broken line is a waveform of the reproduced signal, black circles ● are sampling points of the digital signal sampled with the PLL clock, and a waveform deviation is generated by a medium's characteristics, etc. The correction amount generation circuit 1151 computes a correction amount Y based on the correction coefficients obtained by the correction coefficient generation circuit 1152. In addition, although a correction amount Y can be obtained by Formula (9), Formula (11) can be also substituted in simple as A=0 in Formula (9).

$$Y(i) = B \cdot P(i) \quad (11)$$

Here, the correction amount Y is computed by Formula (11), and an interpolation coefficient G as shown in FIG. 37 is generated on the basis of this. It becomes unnecessary to provide memory holding two adjacent record mark lengths P(i) and P(i−1) by using Formula (11), and it is possible to reduce the load of operation. The waveform correction circuit 1153 computes sampled data E2' and E3' (shown by black squares ■) which are corrected by linear interpolation from the sampled data E1 to E3 in an edge section and the interpolation coefficient G. For example, E2' can be obtained by the following Formula (12).

$$E2' = (G/T) \cdot E1 + ((T-G)/T) \cdot E2 \quad (12)$$

T denotes an interval between sampling clocks. In addition, although the case of linear interpolation is shown here, it is also possible to substitute other well-known interpolation methods for this. Thereby, since the edge shift by a waveform deviation can be reduced, a factor of a decode error is eliminated and it becomes possible to aim at improvement in recording density.

In addition, although the waveform correction here is performed with respect to a reproduced digital signal, the same effect can be obtained by correcting a differential signal when decoding by the differential detection. In addition, when decoding by PRML, there is no need to say that it is also possible to perform correction with respect to a waveform given PR equalization.

(Embodiment 7)

Next, a seventh embodiment of the present invention will be explained. In this embodiment, the following formula is used as a calculation formula of the correction amount Y in the correction amount generation circuit 1116 in FIG. 25.

$$Y(i) = -A \cdot (P(i-1) - R) + B \cdot (P(i) - R) \qquad (13)$$

Here, R denotes a mark length that becomes a reference. It is possible to reduce an absolute value of a correction amount by generating the correction amount by Formula (13). For example, the correction amount becomes "0" by making R=2 in Formula (13) when the record mark length is 2T. Thereby, since the fluctuation of a signal due to correction can be distributed to plus and minus sides, a change from the original reproduced signal can be suppressed.

(Embodiment 8)

Figure 38:
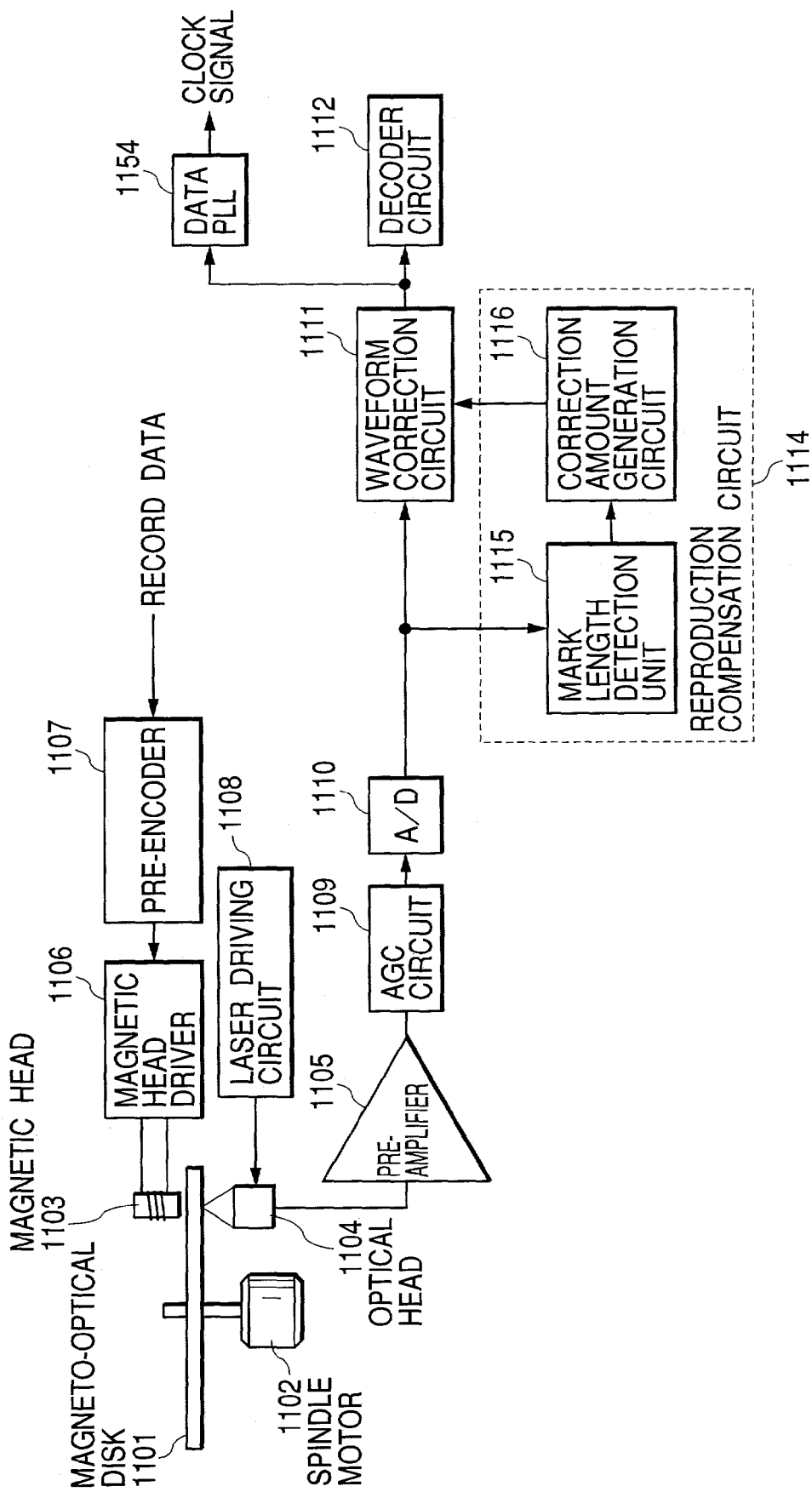
FIG. 38 is a block diagram showing an eighth embodiment of the present invention.

Next, an eighth embodiment of the present invention will be explained. FIG. 38 is a block diagram showing the configuration of the eighth embodiment of the present invention. In FIG. 38, a data PLL 1154 is added to the configuration in FIG. 25. Others are similar to those in FIG. 25. The data PLL 1154 generates a clock signal based on the reproduced signal whose a waveform deviation is corrected in the waveform correction circuit 1111 by the same method as that in the fifth embodiment.

Figure 39:
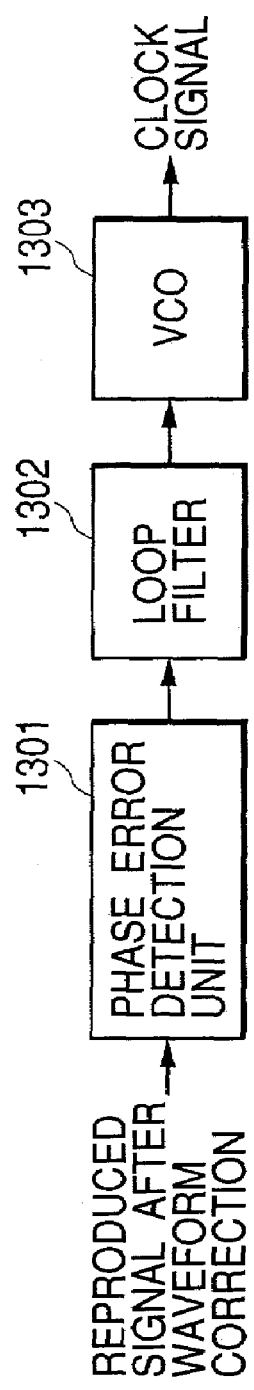
FIG. 39 is a block diagram of data PLL in FIG. 38.

FIG. 39 is a block diagram showing the configuration of the data PLL 1154. In this figure, a phase error detection unit 1301 detects a phase error based on sampled data in a leading edge section of a reproduced signal. A loop filter 1302 performs removal of unnecessary noise from and reduction compensation of a phase error signal. A VCO 1303 generates a clock signal with a frequency corresponding to a control voltage. The data PLL detects a phase error from an edge section of the reproduced signal that is corrected, and supplies the detected signal as a control signal of the VCO after filtering. It is possible to obtain the clock synchronizing with the reproduced signal by performing the loop of this detected signal.

In the apparatus of this embodiment, since a phase error is detected from the reproductive signal whose waveform deviation is corrected, the influence of incorrect detection as shown in FIG. 42D can be reduced, and a proper reproduced signal can be obtained. In addition, a detection method of a phase error is not limited to the above-described method, but another well-known technology can be used.

What is claimed is:

1. An optical information reproducing method of detecting a reproduced signal on a basis of a record mark formed in an optical information recording medium and decoding record data on a basis of the reproduced signal, comprising the steps of:

decoding a record data on a basis of the reproduced signal;
    detecting a mark length of each record mark on a basis of a reproduced signal; and
    correcting a waveform of the reproduced signal before the decoding by a correction amount corresponding to the detected mark length,
    wherein the correction amount is an amount that compensates fluctuation of a record mark edge by a stray magnetic field, and
    wherein, when the correction amount is J, the correction amount J satisfies a relational expression: $J = -A \cdot n(k) + B \cdot n(k+1)$, wherein A and B are constants, n(k) is a mark length at one previous time unit, and n(k+1) is a mark length at present time unit.

2. The optical information reproducing method according to claim 1, wherein A is equal to B in the relational expression.

3. The optical information reproducing method according to claim 1, wherein A is 0 in the relational expression.

4. The optical information reproducing method according to claim 1, wherein the constants are recorded beforehand on the medium.

5. The optical information reproducing method according to claim 1, wherein the constants are computed on a basis of a measurement value obtained by measuring a jitter of a reproduced signal obtained when a record mark row recorded on the medium is reproduced.

6. The optical information reproducing method according to claim 5, wherein the record marks row is user data.

7. The optical information reproducing method according to claim 5, wherein the record marks train is a predetermined pattern.

8. An optical information reproducing method of detecting a reproduced signal on a basis of a record mark formed in an optical information recording medium and decoding record data on a basis of the reproduced signal, comprising the steps of:

decoding a record data on a basis of the reproduced signal;
    detecting a mark length of each record mark on a basis of a reproduced signal; and
    correcting a waveform of the reproduced signal before the decoding by a correction amount corresponding to the detected mark length,
    wherein the correction amount is an amount that compensates fluctuation of a record mark edge by a stray magnetic field, and
    wherein, when the correction amount is J, the correction amount J satisfies a relational expression: $J = A \cdot n(k+1) + B$, wherein A and B are constants, and n(k+1) is a mark length at present time unit.

9. An optical information reproducing apparatus for detecting a reproduced signal on a basis of a record mark formed in an optical information recording medium and decoding a record data on a basis of the reproduced signal, comprising:

a decoder circuit for decoding a record data on a basis of a reproduced signal;
    a detection circuit for detecting a mark length of each record mark on a basis of a reproduced signal;
    a correction circuit for correcting a waveform of the reproduced signal inputted to the decoder circuit, before decoding, by a correction amount corresponding to the detected mark length; and a circuit for generating the correction amount, wherein the correction amount generation circuit measures a phase or amplitude displacement of a reproduced signal obtained when a specific record mark length is reproduced, and computes the correction amount on basis of the measurement value, wherein, when the correction amount is J, the correction amount generation circuit generates the correction amount so that the correction amount J satisfies a relational expression: $J=-A \cdot n(k)+B \cdot n(k+1)$, wherein A and B are constants, $n(k)$ is a mark length at one previous time unit, and $n(k+1)$ is a mark length at present time unit.

10. The optical information reproducing apparatus according to claim 9, wherein A is equal to B in the relational expression.

11. The optical information reproducing apparatus according to claim 9, wherein A is 0 in the relational expression.

12. An optical information reproducing apparatus for detecting a reproduced signal on a basis of a record mark formed in an optical information recording medium and decoding a record data on a basis of the reproduced signal, comprising:

a decoder circuit for decoding a record data on a basis of a reproduced signal;

a detection circuit for detecting a mark length of each record mark on a basis of a reproduced signal, a correction circuit for correcting a waveform of the reproduced signal inputted to the decoder circuit, before decoding, by a correction amount corresponding to the detected mark length; and a circuit for generating the correction amount, wherein the correction amount generation circuit measures a phase or amplitude displacement of a reproduced signal obtained when a specific record mark length is reproduced, and computes the correction amount on basis of the measurement value, wherein, when the correction amount is J, the correction amount generation circuit generates the correction amount so that the correction amount J satisfies a relational expression: $J=A \cdot n(k+1)+B$, wherein A and B are constants, and $n(k+1)$ is a mark length at present time unit.

* * * * *

UNITED STATES PATENT AND TRADEMARK OFFICE
CERTIFICATE OF CORRECTION

PATENT NO. : 7,187,635 B2
APPLICATION NO. : 10/123258
DATED : March 6, 2007
INVENTOR(S) : Tatsushi Katayama It is certified that error appears in the above-identified patent and that said Letters Patent is hereby corrected as shown below:

IN THE DRAWINGS:
Sheet No. 3, Figure 4A, "SHFTEED" should read --SHIFTED--.
Sheet No. 3, Figure 4C, "SHFTEED" should read --SHIFTED--.

COLUMN 1:
Line 34, "of" should read --in--.

COLUMN 2:
Line 42, "of;" should read --of:--.

COLUMN 5:
Line 19, "ahead" should read --ahead of--.

COLUMN 7:
Line 24, "followings." should read --following.--.
Line 52, "neat" should read --near--.

COLUMN 13:
Line 34, "11C is" should read --11C are- --.
Line 42, "is" should read --are--.
Line 57, "Jitter" should read --jitter--.

COLUMN 14:
Line 24, "is" should read --are--.

UNITED STATES PATENT AND TRADEMARK OFFICE
CERTIFICATE OF CORRECTION

PATENT NO.       : 7,187,635 B2
APPLICATION NO.  : 10/123258
DATED            : March 6, 2007
INVENTOR(S)      : Tatsushi Katayama It is certified that error appears in the above-identified patent and that said Letters Patent is hereby corrected as shown below:

COLUMN 22:
Line 51, "in simple as" should read --instead as--.

Signed and Sealed this

Twenty-eighth Day of October, 2008

JON W. DUDAS
*Director of the United States Patent and Trademark Office*